(12) United States Patent
Ritter et al.

(10) Patent No.: US 9,483,329 B2
(45) Date of Patent: Nov. 1, 2016

(54) CATEGORIZING AND MODELING INTEGRATION ADAPTERS

(71) Applicants: Daniel Ritter, Heidelberg (DE); Manuel Holzleitner, Karlsruhe (DE)

(72) Inventors: Daniel Ritter, Heidelberg (DE); Manuel Holzleitner, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/617,059

(22) Filed: Feb. 9, 2015

(65) Prior Publication Data

US 2016/0232042 A1    Aug. 11, 2016

(51) Int. Cl.
G06F 9/54 (2006.01)
G06F 9/44 (2006.01)

(52) U.S. Cl.
CPC .............. G06F 9/541 (2013.01); G06F 8/10 (2013.01); G06F 8/20 (2013.01); G06F 9/546 (2013.01)

(58) Field of Classification Search
CPC .......... G06F 9/541; G06F 9/546; G06F 8/10; G06F 8/20
See application file for complete search history.

(56) References Cited

U.S. PATENT DOCUMENTS

| | | | |
|---|---|---|---|
| 8,543,653 B2 | 9/2013 | Bhatt et al. | |
| 8,655,989 B2 | 2/2014 | Ritter et al. | |
| 8,661,107 B2 | 2/2014 | Hoffmann et al. | |
| 8,739,124 B2 | 5/2014 | Ritter et al. | |
| 8,805,769 B2 | 8/2014 | Ritter et al. | |
| 8,850,005 B2 | 9/2014 | Bhatt et al. | |
| 2003/0037174 A1* | 2/2003 | Lavin ...................... G06F 9/541 719/313 |
| 2003/0105887 A1* | 6/2003 | Cox ............................ G06F 8/20 719/328 |
| 2006/0101474 A1* | 5/2006 | Magown ................ G06F 9/5027 719/315 |
| 2006/0248145 A1* | 11/2006 | Karmakar ............. H04L 69/163 709/206 |
| 2007/0067266 A1* | 3/2007 | Lomet ................ G06F 17/30864 |
| 2008/0059944 A1* | 3/2008 | Patterson ................... G06F 8/10 717/104 |
| 2009/0164558 A1* | 6/2009 | Hofmann ................ G06Q 10/06 709/203 |
| 2011/0265060 A1* | 10/2011 | Fritzsche .................. G06F 8/10 717/104 |
| 2012/0030689 A1* | 2/2012 | Li ........................... G06F 9/541 719/313 |
| 2012/0089534 A1 | 4/2012 | Liebig et al. |
| 2013/0036427 A1* | 2/2013 | Chen ........................ G06F 9/546 719/312 |
| 2014/0068635 A1 | 3/2014 | Holzleitner et al. |
| 2014/0359554 A1 | 12/2014 | Ritter et al. |
| 2014/0372428 A1 | 12/2014 | Mathis et al. |
| 2014/0372488 A1 | 12/2014 | Ritter et al. |
| 2015/0113020 A1* | 4/2015 | Behr ........................ G06F 8/10 707/792 |

OTHER PUBLICATIONS

U.S. Appl. No. 14/335,502, filed Jul. 18, 2014, Ritter et al.
U.S. Appl. No. 14/458,824, filed Aug. 13, 2014, Ritter et al.

* cited by examiner

*Primary Examiner* — Charles E Anya
(74) *Attorney, Agent, or Firm* — Fish & Richardson P.C.

(57) ABSTRACT

The disclosure generally describes computer-implemented methods, software, and systems, including a method for generating and storing adapter characterization information. Adapter-related information associated with an adapter is received. Communication patterns associated with the adapter are determined. Quality-of-service patterns are applied to the communication patterns. An adapter flow is configured for the adapter. A visualization of the adapter flow for the adapter is provided. Characterization information determined for the adapter is stored.

13 Claims, 17 Drawing Sheets

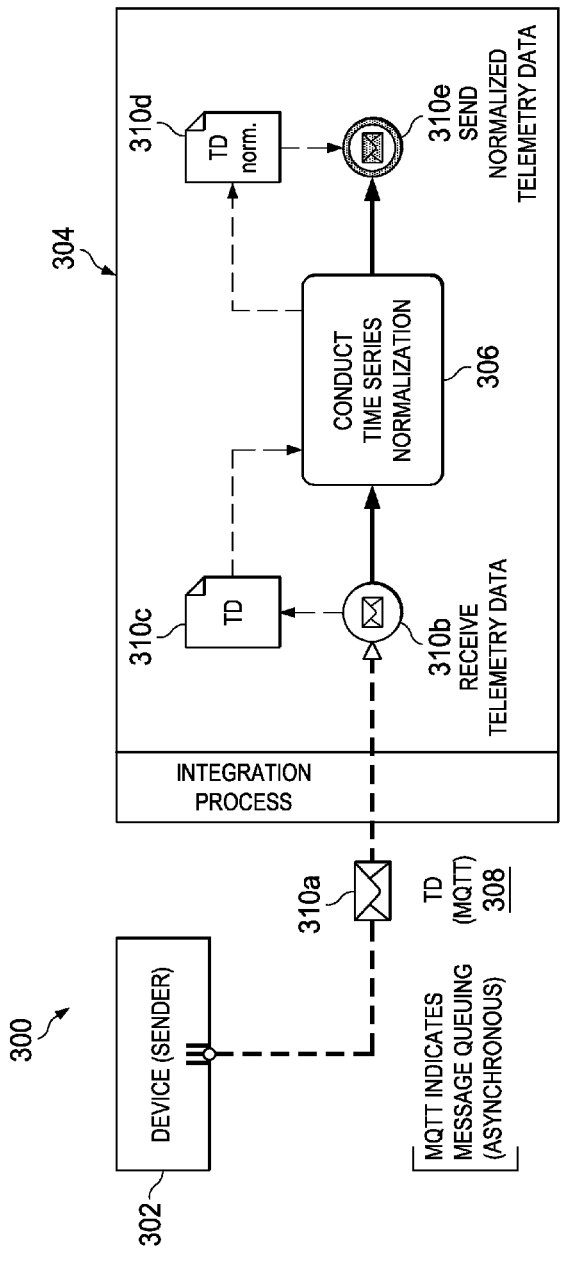
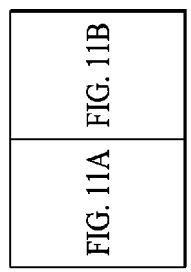
FIG. 9
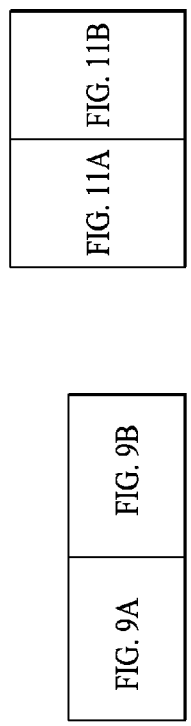
FIG. 11
FIG. 3

CATEGORIZING AND MODELING INTEGRATION ADAPTERS

BACKGROUND

The present disclosure relates to integration adapters used in system integration.

Integration adapters are a fundamental part of an integration system, since they provide applications (e.g., business applications) with access to a messaging channel. For example, messages can be sent and received during an integration process. There can be many different types of integration adapters, some of which may share common characteristics. For example, similar integration adapters can be characterized and/or categorized in the same way.

SUMMARY

The disclosure generally describes computer-implemented methods, software, and systems for generating and storing adapter characterization information. For example, adapter-related information associated with an adapter is received. Communication patterns associated with the adapter are determined. Quality-of-service patterns are applied to the communication patterns. An adapter flow is configured for the adapter. A visualization of the adapter flow for the adapter is provided. Characterization information determined for the adapter is stored. One computer-implemented method includes: receiving adapter-related information associated with an adapter, determining communication patterns associated with the adapter, applying quality-of-service patterns to the communication patterns, configuring an adapter flow for the adapter, providing a visualization of the adapter flow for the adapter, and storing characterization information determined for the adapter.

Integration adapters can be an important part of common integration systems such as enterprise application integration (EAI) systems, enterprise service bus (ESB) systems, and partially manufacturing operations management (MOM) systems. The adapters can take over crucial tasks such as (physical) connection handling, format conversions, scheduling, and quality of service (QoS) support. The adapters can manifest scenario-specific, pre-processing, and/or post-processing capabilities in integration scenarios. Uses and configurations can be related by the conditions under which integration occurs during message processing, and the associated processing and communication styles can be grouped into classes.

Current integration system vendors and modeling approaches do not cover systematic classification of adapter types and tasks within an integration system. Further, default adapter processing in the integration systems can typically be hidden in various runtime implementations. Also, modification of default adapter processing is typically nonexistent.

Being able to systematically describe adapter processing in integration systems, visualize the default behavior, and modify default behavior can allow for a better understanding of integration semantics. This can also provide a higher level of control over a system's behavior, and consequently a more configurable, modular, and/or adaptable system.

Some implementations can use integration flows to specify messaging channels with their control flow and data flow. The adapter processing may be hidden, e.g., behind property sheets. Without an explicit "adapter flow," for example, information regarding the adapter's behavior may not be provided during the reception, sending, and/or processing of messages. Consequently, a developer who maintains the adapter may need to delve into the source code of the configuration to be able to judge the corresponding behavior of the associated adapter processing. As such, partners and customers may not be able to create scenario-specific variations of adapters or model common aspects of adapter processing. Common aspects can include, for example, QoS, synch/asynch and asynch/synch bridges, and/or other aspects.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the adapter is an integration adapter and receiving adapter-related information associated with an adapter includes identifying an adapter type for the adapter, determining a modeling complexity for the adapter, determining an integration style for the adapter, identifying a quality of service level for the adapter, and capturing adapter tasks and an architecture associated with the adapter.

In a second aspect, combinable with any of the previous aspects, determining an integration style for the adapter includes identifying message exchange patterns that identify whether a message is in-only or in-out.

In a third aspect, combinable with any of the previous aspects, determining communication patterns associated with the adapter includes identifying communication styles and bridges for the adapter and determining one or more processing patterns for the adapter.

In a fourth aspect, combinable with any of the previous aspects, applying quality-of-service patterns to the communication patterns includes checking reliability messaging for the adapter, checking idempotency requirements for the adapter, and checking messaging re-sequencing for the adapter.

In a fifth aspect, combinable with any of the previous aspects, adapter types are selected from the group comprising consumer-only adapters, producer-only adapters, consumer+producer adapters, polling adapters, and event-based adapters.

In a sixth aspect, combinable with any of the previous aspects, applying quality-of-service patterns to the communication patterns includes identifying message delivery types selected from the group comprising best effort (BE), at least once (ALO), exactly once (EO), and exactly once in order (EOIO).

In a seventh aspect, combinable with any of the previous aspects, each adapter is associated with a template.

In an eighth aspect, combinable with any of the previous aspects, the stored characterization information is used in a separation of an integration process and an adapter flow for modularity, deployment options, and potentially heterogeneous system setups, along same semantics.

The subject matter described in this specification can be implemented in particular implementations so as to realize one or more of the following advantages. Extract/transform/load vendors can specify adapter-like processing that is similar to adapter flows. Data integration modeling applications can include graphic representations associated with adapters. Adapter categorization and presentation tools can provide a systematic approach to identifying, documenting, and presenting common adapter characteristics, e.g., including adapter classifications (e.g., for synch/asynch bridges, QoS levels). Adapter categorization and presentation tools can use standard or proprietary syntax/notations (e.g., well-known and widely-used standards such as Business Process Model and Notation (BPMN). Adapter categorization and presentation tools can provide wider applicability, thus reducing learning curves for developers. Adapter flows allow a user to define not only the processing of messages, but also the behavior in case of exceptional situations during the processing (i.e., exception handling). Separate adapter definitions allow for modular system setups, in which "adapter runtime systems" can be exchanged by equivalent ones with respect to the adapter flow execution (i.e., adapter virtualization). "Adapter runtime systems" can be distributed (e.g., running different organizational networks), while guaranteeing the specified integration semantics.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 is a diagram of an example Internet of Things (IoT) scenario including device enqueue messages (e.g., asynchronous) for time series normalization.

Like reference numbers and designations in the various drawings indicate like elements.

DETAILED DESCRIPTION

Figure 1A:
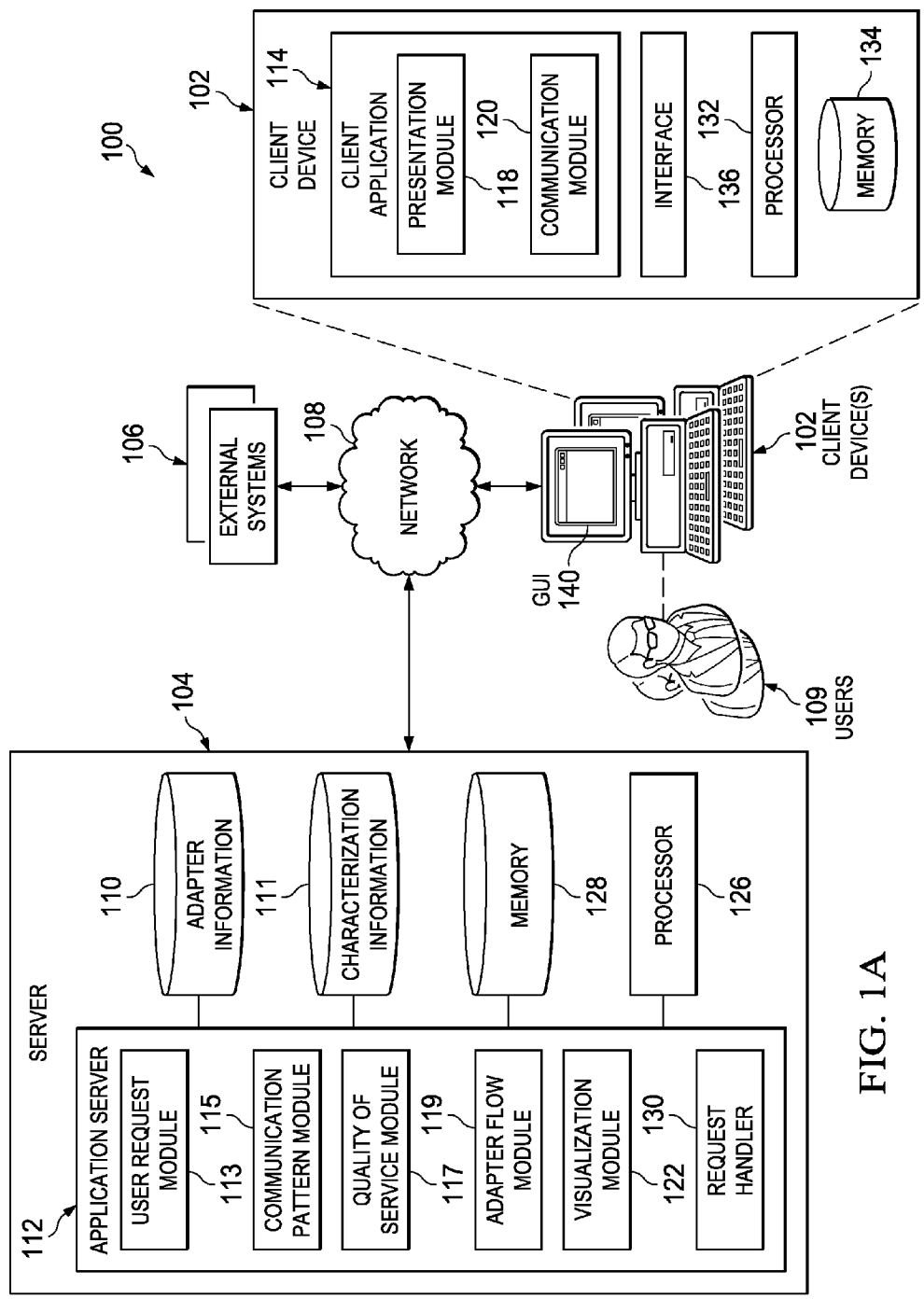
FIG. 1A is a block diagram of an example environment for adapter modeling and presentation.

This disclosure generally describes computer-implemented methods, software, and systems for characterizing adapters. For example, adapters, such as integration adapters, are a fundamental part of an integration system, since they can provide business applications or other applications with access to their messaging channel. However, in conventional systems, their modeling and configuration remain under-represented. For example, while integration control and data flow syntax and semantics may be expressed in the Business Process Model and Notation (BPMN) as a semantic model for message-based integration, adapter and the related quality of service modeling are limited.

In this disclosure, common adapter capabilities are specified, and general modeling patterns are derived, for which a compliant representation is defined in BPMN. The patterns discussed can extend previous work by the adapter flow (AF), e.g., adapters are evaluated syntactically and semantically for common adapter characteristics.

Adapter Classification can provide a solid basis for a systematic categorization of adapters in integration systems, e.g., by providing a sound and comprehensive classification of adapter processing within integration systems. For example, adapter classification can apply to different adapter types (e.g., quality of service (QoS), adapter tasks) and can include all known adapter characteristics.

In some implementations, visualization of default and custom processing can be provided. For example, based on an adapter's classification, an AF syntax for the processing of the different adapter types can be defined. In addition, common processing can be grouped to adapter processing strategies (e.g., message redelivery, skip failed activity—continue—and use original message). These constructs can be further analyzed and combined to adapter patterns (e.g., synch/asynch bridge, AF, quality of service levels) that allow for modular adapter modeling.

QoS (e.g., best effort, exactly once) and transactional processing can be considered with the adapter processing. For example, QoS and transaction scoping patterns and a syntax can be identified that fits to the AFs.

Along with the syntax, a mapping can be defined for a cloud integration runtime system (e.g., a service platform) and a compiler syntax can be provided to a runtime system. The mapping can be reversible, and existing configurations can be visualized. Modification of default and custom processing can occur. For example, a defined syntax can allow for the introduction of specific "adapter flows" (AFs) while leveraging processing strategies and patterns on the identified scopes.

Enterprise application integration can be used by organizations as means of integrating their conventional business applications with each other, e.g., with the growing amount of cloud applications and integration with partners' systems. In many cases, the integration middleware systems can serve as the enabling technology for distributed, mission-critical business processes. For that to occur, these systems can offer well-defined modeling capabilities to describe integration semantics (e.g., message creation, transformation, routing) as well as runtime systems that interpret the definitions for efficient message processing.

FIG. 1A is a block diagram of an example environment 100 for adapter modeling and presentation. Specifically, the illustrated environment 100 includes, or is communicably coupled with, plural client devices 102, a server 104, and one or more external systems 106, connected using a network 108. For example, the environment 100 can be used to present information on the plural client devices 102 using information available from the server 104. Further, input can be received from users 109 on the plural client devices 102 for analysis by the server 104. For example, users 109 can provide adapter-related information and inputs on the plural client devices 102 that is used by the server 104 to characterize adapters associated with the provided information.

At a high level, the server 104 comprises an electronic computing device operable to collect, store and provide access to information for use by the client device 102. A data store of adapter information 110, for example, can include information received from the plural client devices 102. For example, users 109 can provide specific information for an adapter that the server 104 can use to characterize the adapter. The adapter information 110 can also include information maintained by the server 104 for use in characterizing adapters using information received from user inputs. Characterization information that is determined by the application server 112 can be stored in a data store of characterization information 111. For example, the characterization information that is stored can characterize an adapter to one or more of the adapters described below with reference to FIGS. 2-11.

As used in the present disclosure, the term "computer" is intended to encompass any suitable processing device. For example, although FIG. 1A illustrates a single server 104, the environment 100 can be implemented using two or more servers 104, as well as computers other than servers, including a server pool. Indeed, the server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 104 may be adapted to execute any operating system, including Linux, UNIX, Windows, Mac OS®, Java™, Android™, iOS or any other suitable operating system. According to some implementations, the server 104 may also include, or be communicably coupled with, an e-mail server, a web server, a caching server, a streaming data server, and/or other suitable server(s). In some implementations, components of the server 104 may be distributed in different locations and coupled using the network 108.

In some implementations, the server 104 includes an application server 112 that performs processing at the server 104 that is needed to support requests for data and analysis of information received from the client device 102. For example, the application server 112 can receive adapter-related information and inputs from the client device 102. Further, the application server 112 can use the received information to characterize an adapter as having characteristics, as described below with reference to FIGS. 2-11.

The application server 112 includes a user request module 113, for example, that can receive, from the client device 102, adapter-related information associated with an adapter. For example, the information received can be information provided by the user in a client application 114, such as a front end for inputting adapter-related information used to characterize a specific adapters. The user request module 113 can also prepare data that is to be presented by a presentation module 118 at the client device 102. For example, the user request module 113 can prepare data for presentation based on user inputs received by a communication module 120. The inputs, for example, can include user inputs for specifying particular information associated with an adapter. The user request module 113 can also be used by the server 104 for communicating with other systems in a distributed environment, connected to the network 108 (e.g., the client device 102), as well as other systems (not illustrated) communicably coupled to the network 108. Generally, the user request module 113 comprises logic encoded in software and/or hardware in a suitable combination and operable to communicate with the network 108. More specifically, the user request module 113 may comprise software supporting one or more communication protocols associated with communications such that the network 108 or interface's hardware is operable to communicate physical signals within and outside of the illustrated environment 100.

The application server 112 further includes a communication pattern module 115 for determining communication patterns associated with an adapter. For example, determining communication patterns can include identifying communication styles and bridges for a given adapter and determining one or more processing patterns for the adapter, as described below with reference to FIGS. 2-11.

The application server 112 further includes a quality of service module 117 that can be used to apply quality-of-service patterns to the communication patterns. For example, applying quality-of-service patterns can include checking reliability messaging for the adapter, checking idempotency requirements for the adapter, and checking messaging re-sequencing for the adapter. Information used for applying quality-of-service patterns to the communication patterns can be accessed from the adapter information 110.

The application server 112 further includes an adapter flow module 119. For example, the adapter flow module 119 can configure an adapter flow for the adapter based on adapter flow information that is stored in the adapter information 110.

The application server 112 further includes a visualization module 122. As an example, the visualization module 122 can generate instructions so that a visualization for an adapter can be displayed on the client device 102. For example, the visualization can match one of the visualizations shown in FIGS. 2-11.

The server 104 further includes a processor 126 and memory 128. Although illustrated as the single processor 126 in FIG. 1A, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 126 executes the functionality required to receive and process requests from the client device 102 and analyze information received from the client device 102.

The memory 128 (or multiple memories 128) may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104. In some implementations, memory 128 includes one or more of the adapter information 110 and the data store of characterization information 111. Other components within the memory 128 are possible.

Each client device 102 of the environment 100 may be any computing device operable to connect to, or communicate with, at least the server 104 via the network 108 using a wire-line or wireless connection. In general, the client device 102 comprises an electronic computer device operable to receive, transmit, process, and store any appropriate data associated with the environment 100 of FIG. 1A.

A request handler 130, e.g., included in the application server 112, can receive inputs and handle requests received from the client device 102. Specifically, the request handler 130 can receive user inputs, including adapter-related information, entered by the user 109 on the client application 114. In some implementations, the request handler 130 can also process requests received from other sources in addition to client devices 102, e.g., requests received from external systems 106.

The illustrated client device 102 further includes a processor 132, a memory 134, and an interface 136. The interface 136 is used by the client device 102 for communicating with other systems in a distributed environment—including within the environment 100—connected to the network 108, e.g., the server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1A are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1A, the client device 102 includes the processor 132. Although illustrated as the single processor 132 in FIG. 1A, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the server 104 and to receive and process responses from the server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens that support user input of adapter-related information and display visualizations of adapters using information received from the server 104.

Figure 1B:
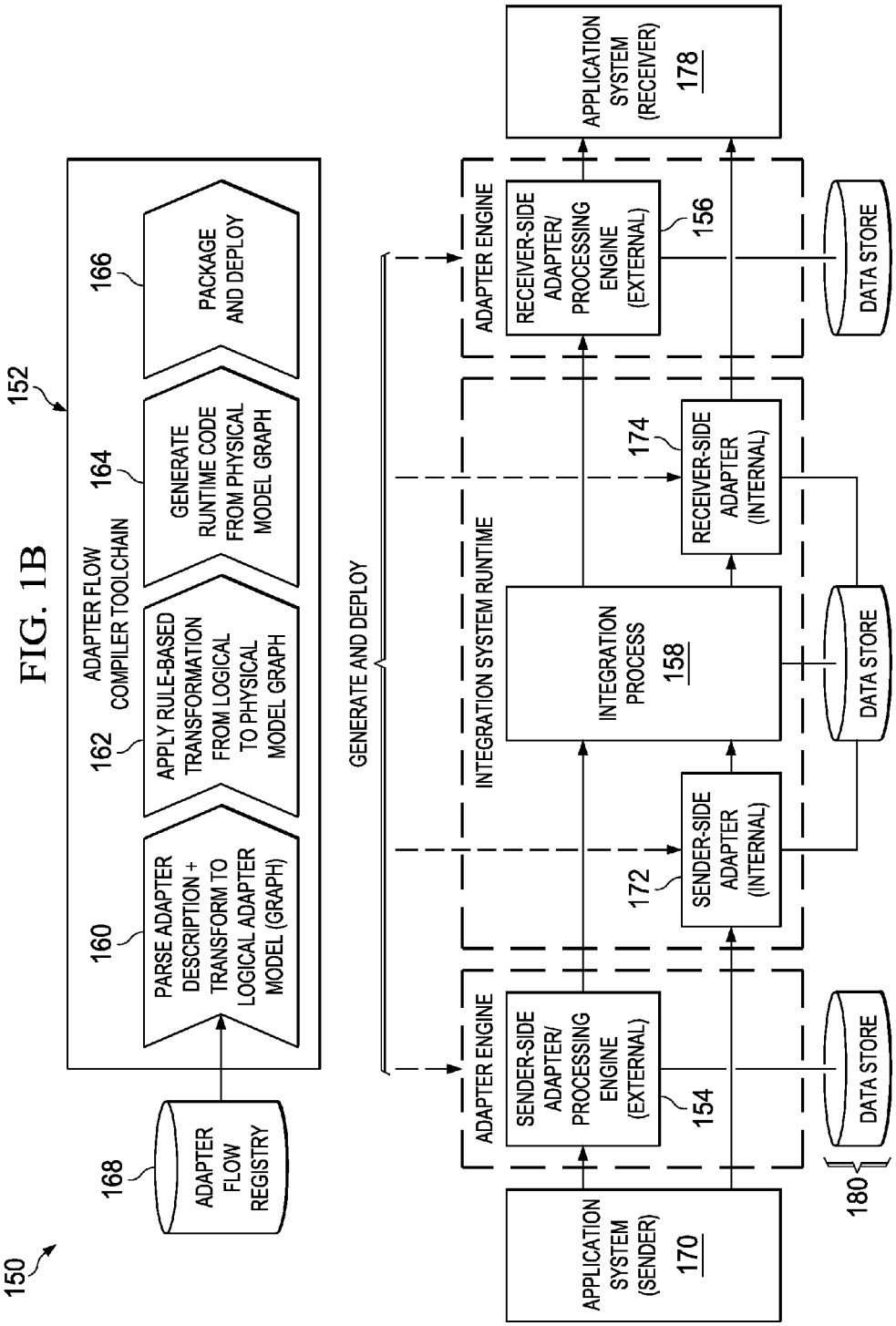
FIG. 1B is a diagram of an example adapter process flow.

FIG. 1B is a diagram of an example adapter process flow 150. For example, the adapter process flow 150 can involve operations associated with an adapter flow compiler toolchain 152, adapters 154 and 156, and an integration process 158.

In some implementations, the AF compiler toolchain 152 includes various steps for classifying and modeling adapters. For example, a step 160 can parse and obtain adapter information. A step 162, for example, can apply rules and/or other transformations to the parsed/obtained adapter information. A step 164, for example, can generate runtime code associated with the adapter. A step 166, for example, can package and deploy the adapter. The AF compiler toolchain 152 can use adapter information in an AF registry 168, e.g., that includes information associated with patterns and characteristics in different adapter types. The AF compiler toolchain 152 includes processing, for example, that supports steps in the method process described below with respect to FIG. 12.

Processing among the adapters 154 and 156, and an integration process 158 can include information sent by an application system 170 (e.g., a sender), a sender-side adapter 172, a receiver-side adapter 174, and a receiver application system 178. Other processing is possible. The processing can make use of information stores in data stores 180 used by the adapters.

Figure 2:
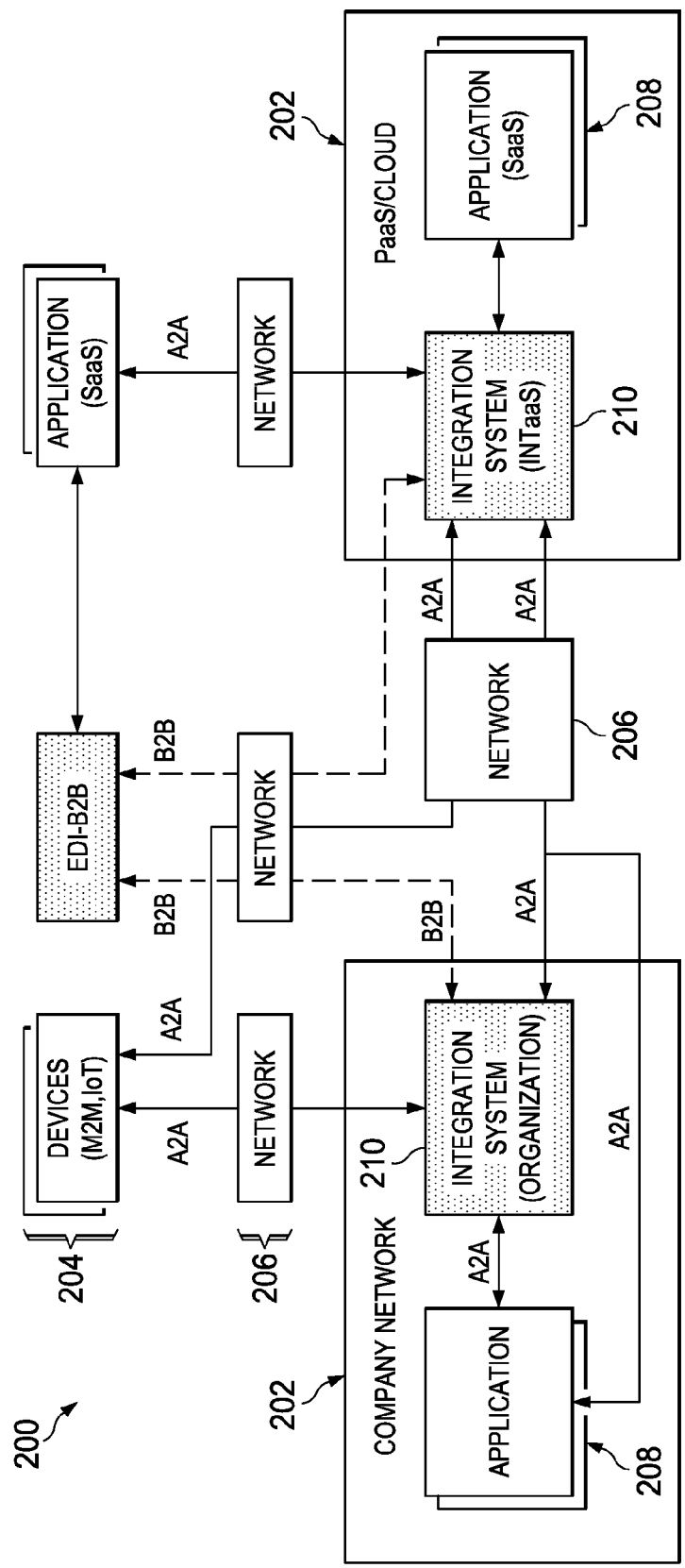
FIG. 2 is a diagram of an example conceptual view of an integration architecture of organizations.

FIG. 2 is a diagram of an example conceptual view of an integration architecture of organizations 200. For example, FIG. 2 shows a typical conceptual overview of application-to-application (A2A) and business-to-business (B2B) integration, which can be found in many organizations. Aspects include many connections or integration adapters 202, which are typically under-represented in conventional integration modeling domains. The integration adapters 202 can be for integration, for example, of systems 204 over a network 206. The integration adapters 202 include applications 208 and integration systems 210. Other components are possible.

Integration semantics can be described based on a comprehensive (often graphically depicted) syntax and execution semantics (e.g., process model). Some implementations can collect a widely-used and accepted collection of integration patterns that are typical concepts used when implementing a messaging system and have proven to be useful in practice. However, the implementations may not specify a semantic model for the formalization of the integration syntax and semantics. Most noticeable, the integration adapter modeling with its manifold characteristics can be reduced to a channel adapter icon in the figure.

In some implementations, a domain-specific language (DSL) can be studied and provided with well-defined building blocks for modeling enterprise integration patterns (EIPs) in the Business Process Model and Notation (BPMN), which is typically considered a "de-facto" standard for modeling business process semantics and their runtime behavior. EIPs can be mapped to BPMN-compatible syntax and defined execution semantics adapted to message processing. The use of EIPs can be extended to end-to-end flows of messages, called integration flows (IFlows). An IFlow can be considered as message-based integration from a sending application (e.g., sender, BPMN participant) to one or many receiving applications (e.g., receiver(s), BPMN participants). The message-based integration can use BPMN message flow configurations (e.g., denoting the inbound and outbound adapters) and dedicated participant(s) that specify an integration process (composition of EIPs). In some implementations, BPMN can be used for defining a "message-based integration" DSL due to its sufficient coverage of control flow, data/exception flow, process modeling capabilities, and execution semantics. Current work in the area of data in business processes, for example, includes configuration-based release processes (COREPRO), which mainly deals with data-driven process modeling, (business) object status management, and UML activity diagrams. However, BPMN can achieve higher coverage in the categories relevant for the approach. As will be appreciated by those of ordinary skill in the art, other design artifacts and modeling methodologies instead of or in addition to EIPs and BPMN can be used.

FIG. 3 is a diagram of an example Internet of Things (IoT) scenario including device enqueue messages (e.g., asynchronous) for time series normalization. For instance, FIG. 3 shows an excerpt of an asynchronous integration scenario 300 from an IoT domain, e.g., syntactically expressed in BPMN. The asynchronous integration scenario 300 includes a device 302 (e.g., a sender) and an integration process 304 (e.g., an adapter) that includes a time series normalization 306. The encrypted incoming message can be of type "TD" (telemetry data), which has to be normalized with respect to its timestamps using a message transformation pattern. A message queue telemetry transport (MQTT) 308 can be used as a transport protocol, which is a common, lightweight queuing protocol frequently used in the IoT domain. The approach to specifying integration semantics and its runtime can work well for common integration scenarios. More complex scenarios may have to deal with non-trivial combinations of message exchange pattern (MEP) and QoS levels. These notions may be mostly induced during the adapter processing and continued into the integration process. Current conventional integration modeling approaches (a) do not classify adapter characteristics, (b) leave the default adapter processing (mostly) hidden in the various runtime implementations, and (c) do not allow for configuration and/or change of the default behavior. FIG. 3 also shows telemetry data 310a-310e in various stages.

This disclosure describes a comprehensive investigation of the range of characteristics of adapters during the integration flow processing and the various ways in which they can be addressed. This provides the foundation for a classification of the adapter modeling, which can be subsequently defined in the form of an AF and patterns. The pattern-based approach to adapter classification can be an extension and improvement over existing EIPs and the IFlow. For example, the adapter processing patterns have proven to be intuitive to both practitioners and researchers alike and have been widely utilized for a variety of purposes including customer and partner content development. The adapter processing patterns provide the conceptual foundations for a cloud integration system, which can be an integration as a service implementation based on an open-source integration system. The motivation for this disclosure is to provide a conceptual framework for classifying the adapter processing capabilities of middleware systems more generally based on the IFlow modeling approach, while being independent of the specific runtime platforms. Major components of this work are (1) a comprehensive classification of common adapter characteristics in integration systems and beyond, (2) an extension of the BPMN-based IFlow model for adapter flows (AFs) that make default processing visible to the user for all identified categories from and allows for change of the default behavior, (3) the derivation of common adapter processing patterns and their representation in BPMN, and (4) the application to an existing open source middleware system. This disclosure proposes to answer to the underlying questions such as "which QoS does the IFlow in FIG. 3 have?" and "how can the default handling be adapted to custom requirements?"

Regarding adapter modeling characteristics, the following section introduces a generalized integration system architecture, describes classifying adapter characteristics into classifications, and describes formulating the classifications as modeling requirements. The adapter type classification can be supported by an analysis of some number of message endpoints, e.g., using experience and knowledge provided by experienced integration experts.

Figure 4:
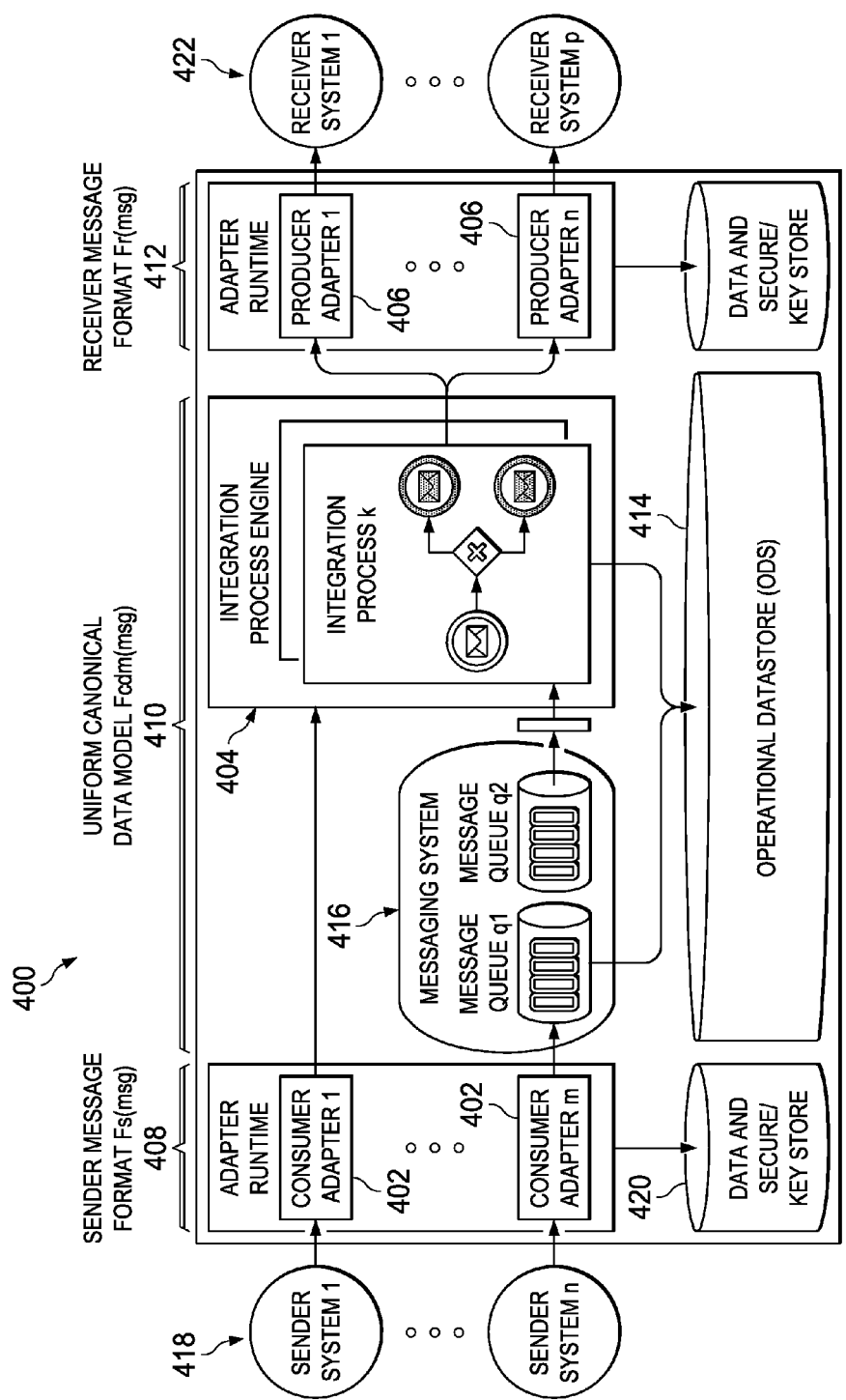
FIG. 4 is a diagram of an example conceptual view of a conventional integration system 400 with a slight emphasis on the consumer and producer adapters.

FIG. 4 is a diagram of an example conceptual view of a conventional integration system 400 with a slight emphasis on the consumer and producer adapters. For example, as illustrated in FIG. 4, conventional integration systems can consist of a set of event-based or polling consumer adapters 402, an integration process engine 404 (e.g., which executes sets of routing and message transformation tasks), and a set of producer adapters 406. The adapters 402, 406 can represent the message endpoint pattern. The adapters can deal with security concerns and format conversions from the sender format $F_s$(msg) 408 to an internal format $F_{cdm}$(msg) 410 (e.g., a canonical data model). The pattern can be used, for example, for integration processing and conversions from the canonical data model (CDM) to the target format $F_r$(msg) 412 understood by the receiver. The internal messages can be either distributed to message queues (e.g., asynchronously) or directly sent to the integration system process engine (e.g., synchronously). The system can use a set of outbound adapters to actively interact with external systems. During the whole integration process, recoverability can be supported. For example, the internal message representations can be stored locally using an operational data store 414 or can be queued 416 for cross-process or cross-system message exchange. FIG. 4 also shows senders 418, data and secure/key stores 420, and receivers 422. The execution environment of the consumer and producer adapters can be at adapter runtime, which is part of the application server for conventional integration systems, or can use an arbitrary software stack. Connections to related parts of the system (e.g., messaging system, data store) are discussed subsequently as part of the classification. Five main categories are considered, which make it possible to comprehensively describe adapters. Common capabilities from these categories are discussed, and requirements are derived for a general adapter modeling approach.

Adapters can be canonically differentiated by their type, e.g., consumer or producer. A consumer adapter, for example, can allow the message sender applications to connect to the integration system. Message consumers can be further sub-divided by their behavior into polling and event-based adapters. The polling adapter (e.g., (S)FTP) can be configured to actively check for messages to read and process the messages (e.g., a model polling consumer). As such, settings like the polling interval, location, (initial) delay and format, can be specified. In contrast, an event-based consumer can specify an endpoint configuration (e.g., a servlet URI) on which the configuration can register a passive listener that waits for events or callbacks from the sender (e.g., a model event-based consumer). A producer adapter can forward the messages to their receivers (e.g., a model producer). As a result, adapters can be consumer-only adapters, producer-only adapters, or consumer+producer adapters. Despite the difficult task of determining "active" adapters, a significant percentage of sender adapters can be classified as "polling."

Configuration complexity is another way of classifying adapters. For example, an analysis of 119 component bundles can result in identifying 151 single components, or adapters. Components such as mail, for example, can encapsulate multiple endpoints represented by protocols such as SMTP, POP3, IMAP, and/or other protocols. Another outcome of the analysis may show a percentage of components that require more complex configurations, e.g., for the parameterization of connection and credential details, e.g., key/trust store references, as shown in FIG. 4. In some implementations, scenario specific adaptations can be identified for an adapter's behavior. For example, the adapter can provide extension points to hook in one or more custom processors, which can be modeled similar to an IFlow. Evidence for such a requirement can also be found in concepts such as "channel modules," e.g., in process integration middleware systems. This can serve as an extension to adapters, which can be combined to the notion of "message channel" modeling, similar to the integration process. As such, a message channel can consist of consumer/producer adapters and arbitrarily many ordered processors.

Integration Styles are another way of classifying adapters. For example, a message exchange pattern (MEP) can define whether a message is sent inOnly (i.e., one-way) or inOut (i.e., two-way). A "two-way" message, for example, can require a synchronously sent response, while a "one-way" message will never result to a response. A synchronous message exchange can require an immediate response during the initiated communication (i.e., mostly by event-based adapters), while an asynchronous exchange can allow for an early close of the initiated communication, and the response can be sent using mechanisms such as "function/method callback". An example adapter in this context is a persistent adapter such as a "web service-reliable message" adapter. This adapter, for example, can receive and store the message, send an immediate response, and then start a transactional redelivery. This type of adapter includes "synch/asynch bridge" adapters, e.g., in model message synch/asynch or asynch/synch communication. These adapters are necessary to "bridge" asynch communication to synch endpoints, and vice versa.

QoS is another way of classifying adapters. For example, service qualities of an integration system can be induced or supported by adapters such as (listed here in increasing quality level): best effort (BE), at least once (ALO), exactly once (EO), and exactly once in order (EOIO). BE messaging, for example, can be summarized as "fire-and-forget", which means that no guarantee for the delivery of a message is given. If a message is to be delivered at least once (ALO), for example, then the message has to be persistently stored and redelivered from an adapter or the integration process. In case the message is to be delivered exactly once (EO), for example, then ALO has to be enhanced (e.g., by an idempotent receiver), which stores the primary identifier of a message and filters out known messages. In idempotent transactions, for example, data retrieval operations and messaging can be performed reliably without changing or otherwise affecting the data. Although a receiver itself may behave idempotent, producer adapters or the integration process can try to act in the receiver's place. For some integration cases, for example, the strict adherence to a message sequence is important (e.g., when creating a business object, or before an update). As such, messages in this case are to be sent exactly once in order (EOIO). Therefore, EO can be extended by a resequencer pattern, which collects messages to emit them in the correct order.

Figure 5:
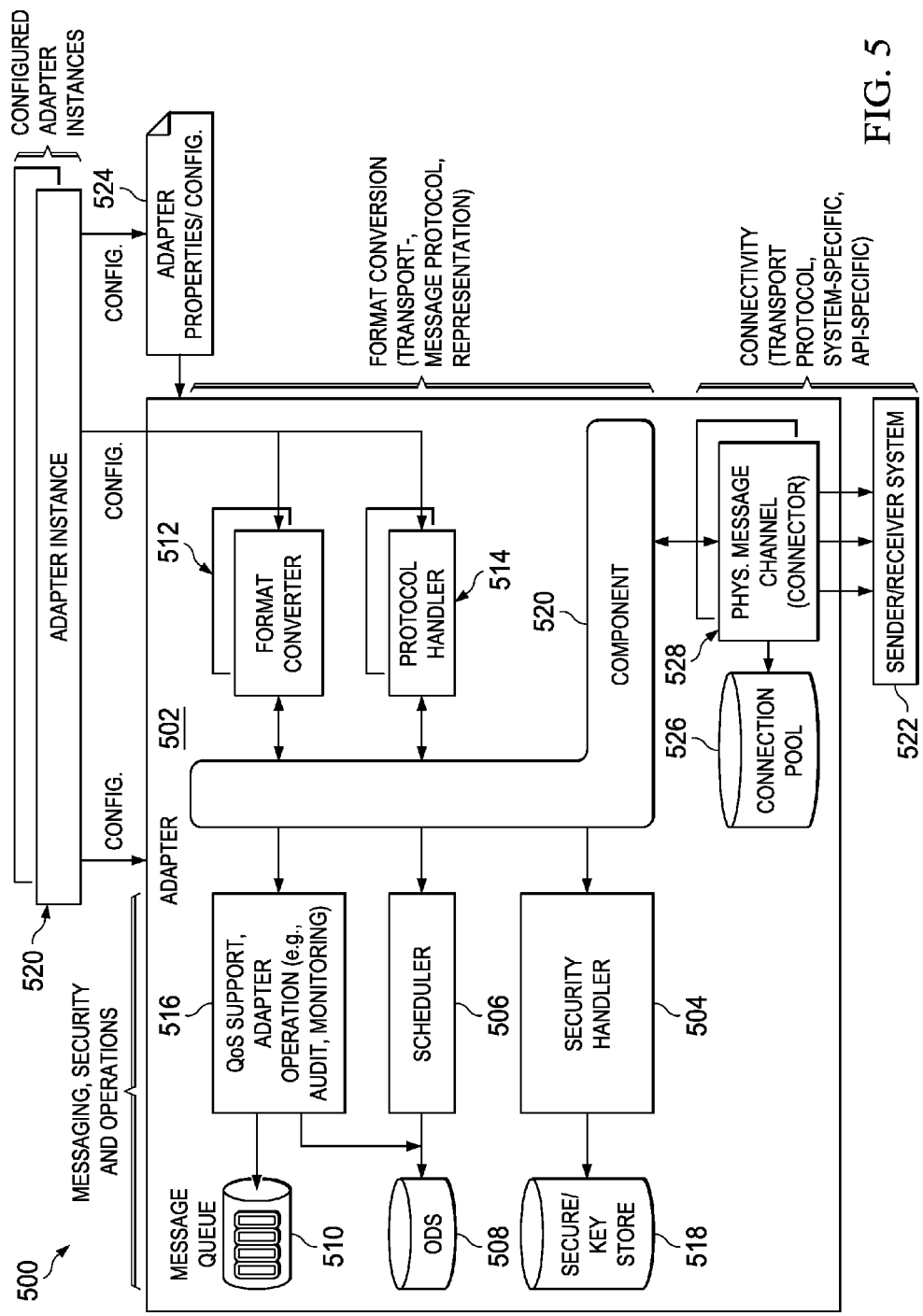
FIG. 5 is a diagram of an example adapter micro-architecture.

FIG. 5 is a diagram of an example adapter micro-architecture 500. For example, FIG. 5 depicts a conceptual view on the internal architecture of a common adapter 502. Each adapter can specify, for example, a connector or a connection handler. The connector can establish a physical connection to the message endpoints. For secure connections (e.g., user/password, certificates), a security handler 504 can be used. Polling consumers can require a scheduler 506 for use in the configuration of the polling interval. For the QoS and monitoring support (e.g., message and channel monitoring), an operational data store (ODS) 508 or a message queue 510 can be used. One example counterpart to the transport protocol handling connector (e.g., Hypertext Transfer Protocol (HTTP), File Transfer Protocol (FTP), or Java Message Service (JMS)) is the format conversion (e.g., XML, JSON, CSV) (e.g., by a format converter 512). An adapter can be configured to transform the sender format $F_s(msg)$ to the internal representation $F_{cdm}(msg)$ and eventually to the receiver format $F_r(msg)$. The modeled adapter can be re-used in different adapter instances/configurations.

In some implementations, following an IFlow modeling approach, adapters can be represented as message flows in BPMN, as shown in FIG. 3. This approach can sufficient to model integration processes with a "simple" adapter configuration, although the approach can over-define BPMN message flows. The approach can also make the characteristics of an adapter implicit and not allow for modeling of complex logic other than on second-level property sheets. For more complex adapter processing, an explicitly modeled AF can be defined that is similar to integration processes and uses basic processing capabilities. More complex patterns are then derived from the requirements to model capabilities such as secure communication patterns (e.g., request/response and "bridging") and QoS patterns (e.g., reliable messaging with transactional redelivery, idempotent receiver, message resequencer).

An AF can replace the currently used BPMN message flow by an additional BPMN pool outside the integration process for more complex adapters that specify an own control-, data- and exception flow. Thus, messaging capabilities, as described in the EIPs, can be expressed within AFs. However, the physical connections to the sender/receiver can be represented by message flows.

The AF of adapters with several selectable transport protocols, e.g., represented by connector and protocol handler 514 (e.g., see FIG. 5), can remain stable, while the entering message flow of consumer and the leaving message flow of producer adapters can change based on selections. FIG. 5 also shows an operation module 516, a secure/key store 518, a communication component 520, adapter instances 522, a sender/receiver system 524, adapter properties 524, a communication pool 526, and a physical message channel 528.

Figure 6:
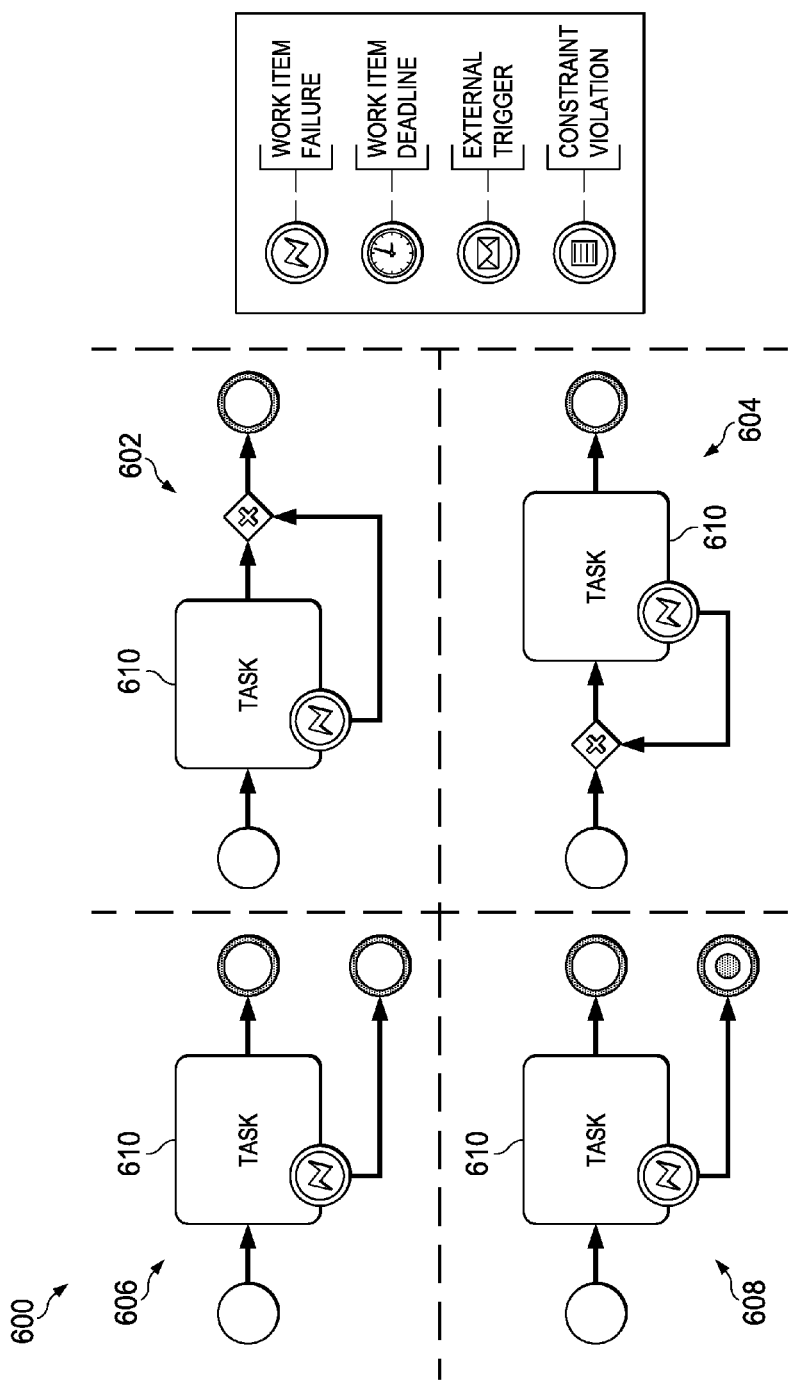
FIG. 6 is a diagram of example AF message processing patterns.

FIG. 6 is a diagram of example AF message processing patterns 600. Basic "processing capabilities", as modeled in FIG. 6, can be used within AFs. A pattern 602, for example, includes skipping of processing steps based on conditions or errors. A pattern 604, for example, includes message redelivery. These mechanisms can be explicitly modeled using BPMN exclusive gateway elements. An adapter can decide to terminate the processing of one message (e.g., as shown in a pattern 606) or the whole process (e.g., as shown in a pattern 608) in exceptional situations or through other events. In case of synch communication, for example, a response can be returned to the sender. When the basic processing capabilities are combined, for example, more complex "adapter processing" can be expressed. Complex adapter modeling patterns for communication and QoS support may be used to avoid the occurrence of complex adapters. FIG. 6 also shows tasks 610 that are the primary focus of each of the patterns 602-608.

Adapter communication patterns can specify several more complex interactions of adapters and integration processes within and outside an organization. For example, different adapter communication patterns can have different communication styles and bridge patterns. Common (business) applications, for example, can support interfaces for synchronous (synch) and/or asynchronous (asynch) communication styles. Synch communication, for example, means applications respond to requests (e.g., with error codes or resulting data), while the requesting application is blocking in order to get the response (e.g., RPC-style). In asynch communication, for example, the sending application sends requests without waiting for responses from other applications and immediately continues with its processing after sending a message (e.g., in a non-blocking scenario). In some implementations, some the sending applications may offer callback interfaces for getting responses back for their previously and asynchronously sent requests. Integrating applications that do not share the same communication style can require an adapter, for example, for bridging/translating between both communication styles.

Figure 7A:
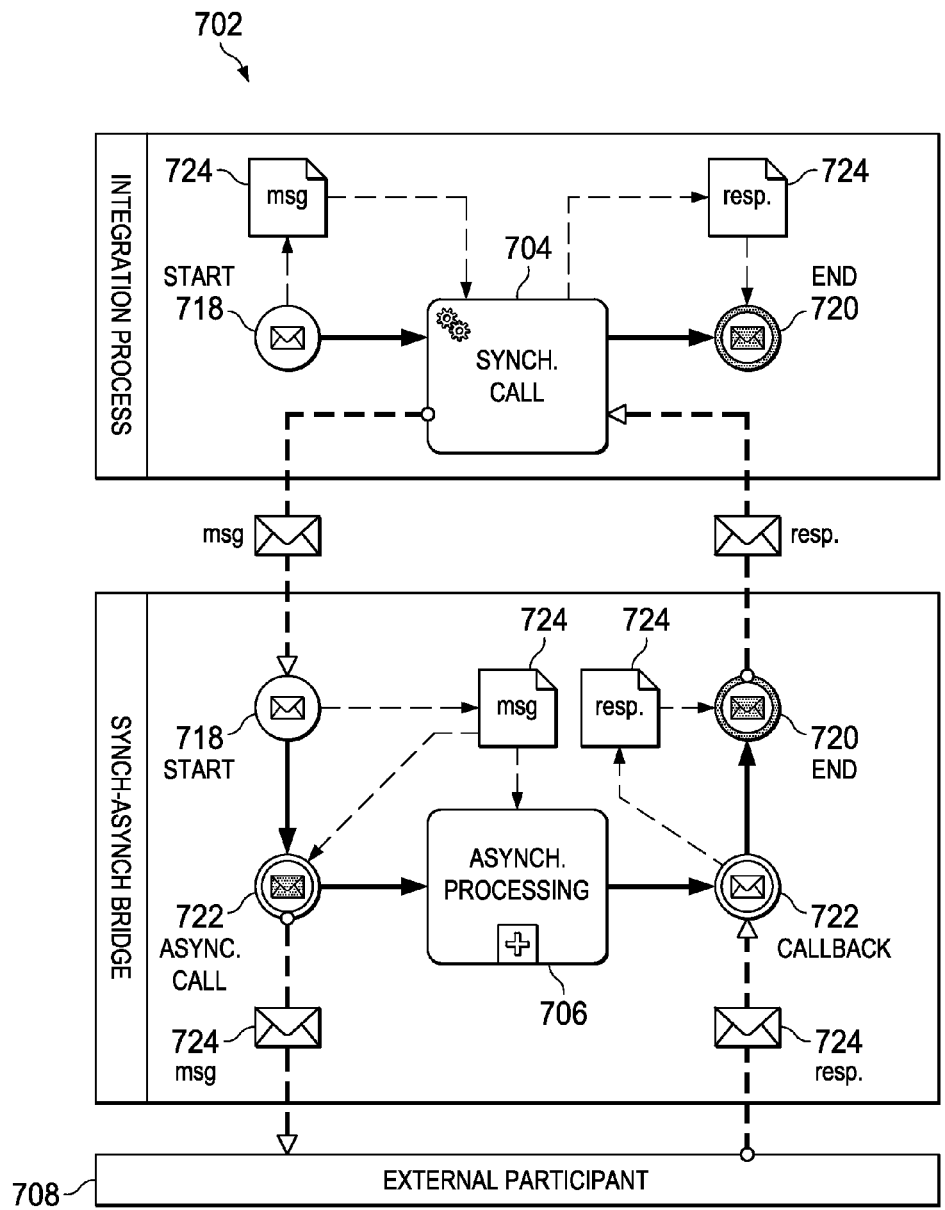
FIGS. 7A and 7B are diagrams of example adapter bridge patterns.
Figure 7B:
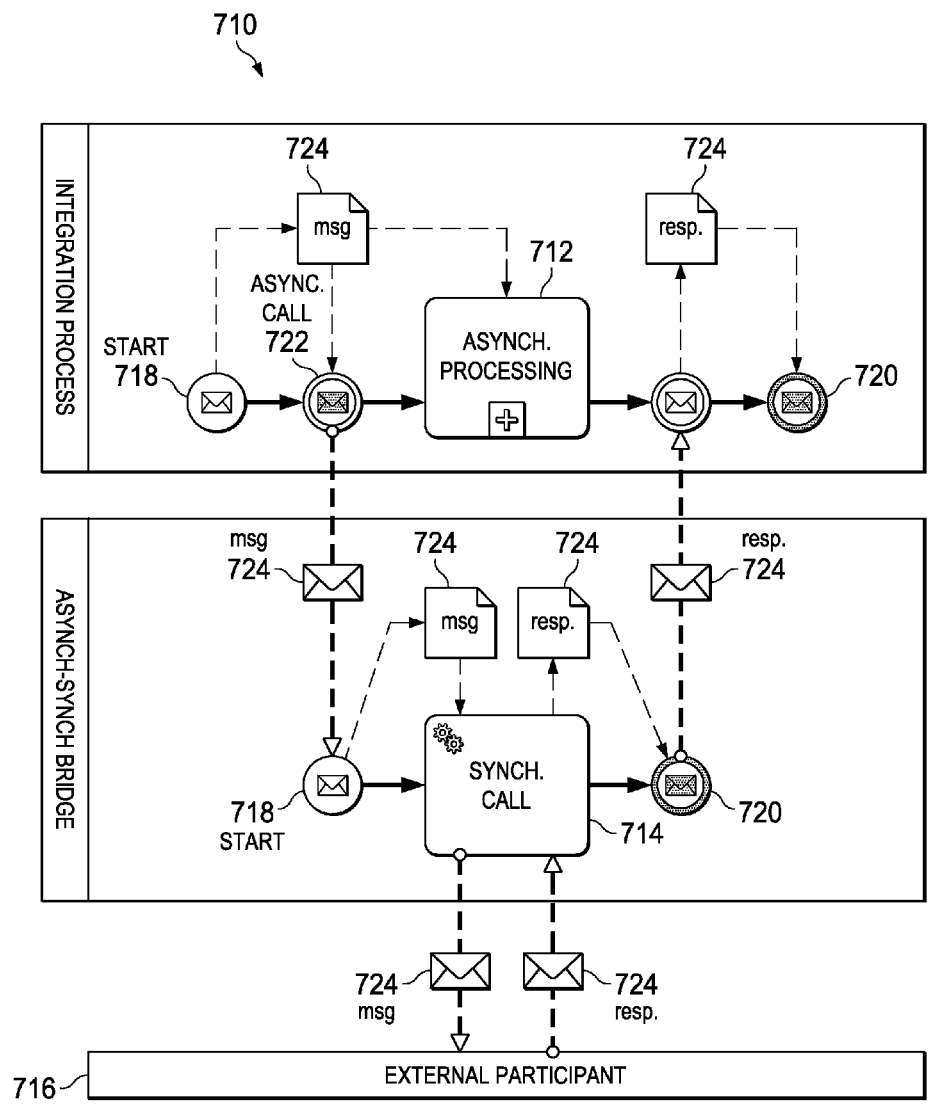

FIGS. 7A and 7B are diagrams of example adapter bridge patterns. For example, FIG. 7A shows a synch-to-asynch bridging adapter 702, which indicates the modeled data and control flow for a synch to asynch bridge. In this example, a synch call 704 follows the inOut message exchange pattern. The synch call 704 in the integration process can be modelled as a BPMN service task that connects with a message flow to the synch-asynch bridge BPMN pool. The message can then be forwarded to an asynch call 706 represented as a BPMN intermediate message end event that connects using a message flow to an external participant 708. Processing can continue with asynch processing that reacts to callback messages in a BPMN intermediate message start event and forwards the response to the synch call service task.

Following the same pattern, FIG. 7B shows a model for an asynch to synch bridge adapter 710 and includes the handling of responses and forwarding them to callback interfaces. For example, the asynch to synch bridge adapter 710 includes an asynch call 712, a synch call 714, and an external participant 716. Both bridge adapter modeling patterns can be reused, applied and adjusted in other IFlows or inlined to the integration process of an IFlow. FIG. 7 also shows start events 718, end events 720, calls 722, and messages/responses 724.

In some implementations of processing patterns, AFs can be modeled to adapt between two integration processes across tenant or network boundaries (e.g., application-to-application (A2A) and business-to-business (B2B)), for which an integration process is associated to one tenant or network. In the case of cross-tenant integration, for example, the IFlow of tenant $T_a$ can adapt to an IFlow in another tenant $T_b$ by representing the IFlow of $T_b$ as an delegate in the IFlow of $T_a$ and vice versa. As such, IFlows are either "local" to one tenant (e.g., meaning that they are locally visible and modifiable) or IFlows are "remote" (e.g., meaning that they can only be connected from "local" IFlows but not made visible or modified). As such, for synch communication, the "remote" IFlow can be represented as a collapsed BPMN pool (e.g., cannot be expanded) and connected to the "local" integration process with request/response BPMN message flows. For reliable asynchronous communication, for example, a shared data store can be used to make the necessary queuing step explicit. As a representative pattern, this "remote" IFlow delegate can also be used to model across networks or IFlows, such as by changing its type.

Different quality of service patterns can exist, e.g., with higher QoS levels denoting more complex configuration building blocks. Subsequently, the necessary patterns can be defined and mapped to BPMN.

Reliable Messaging is another important aspect associated with adapters and communication. For example, to guarantee that a message is not lost in asynchronous scenarios, the message can be stored into a message store (e.g., database) or enqueued to a messaging system (e.g., JMS brokers) before the reception is explicitly or implicitly acknowledged using an acknowledgement (e.g., ACK) to the sender. As such, an integration system can aim to store the message in the consumer adapter, sending the acknowledgement messages to unblock the sender waiting for a response and to minimize the possibilities for errors before a persistency step. Similarly, some adapters can access a data store/queue for cross-applications and software systems (e.g., JDBC, JMS). AFs can also connect to a BPMN data store, e.g., to model key and trust stores.

Figure 8A:
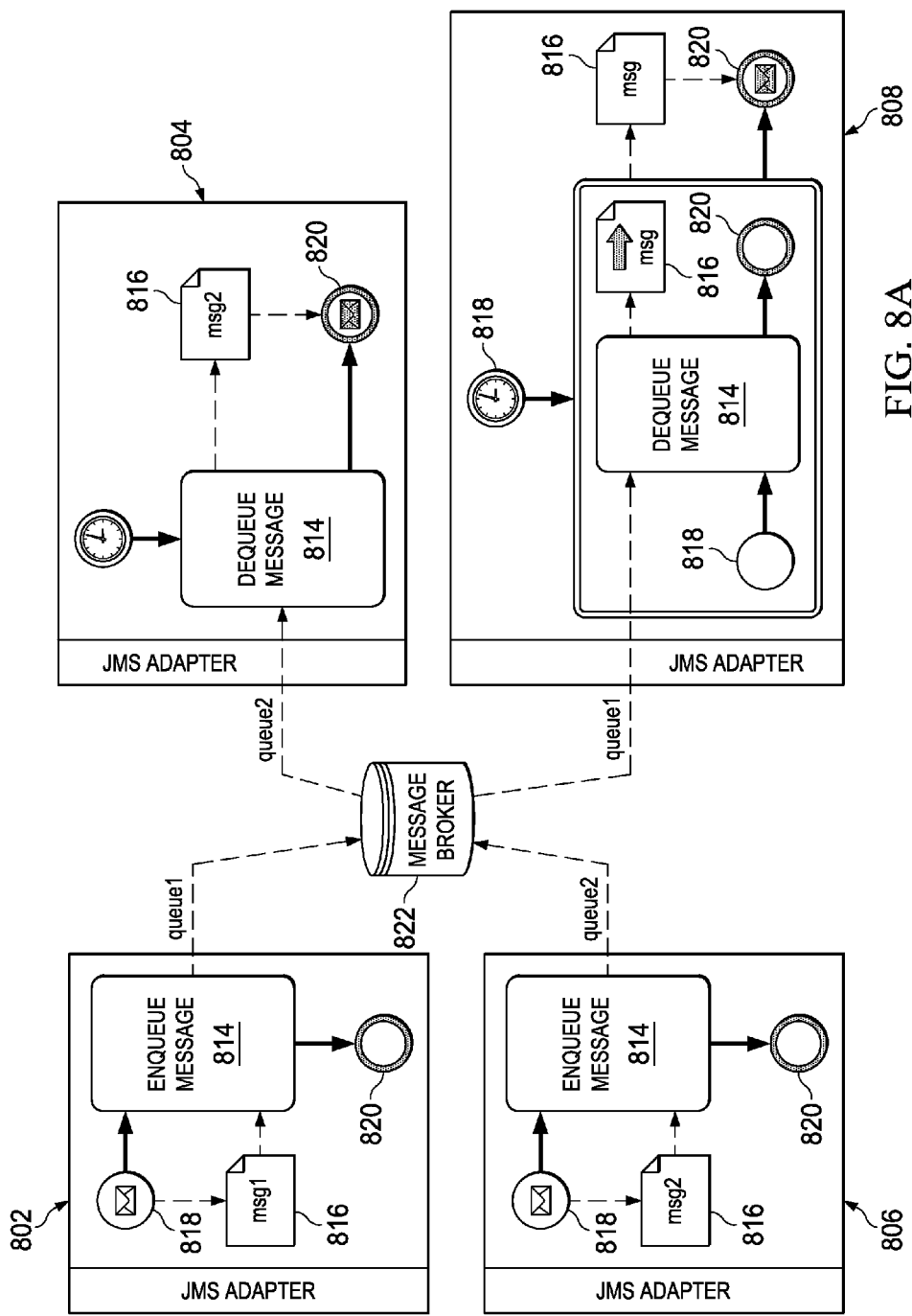
FIG. 8A is a diagram of example adapter modeling with message queuing using data stores.
Figure 8B:
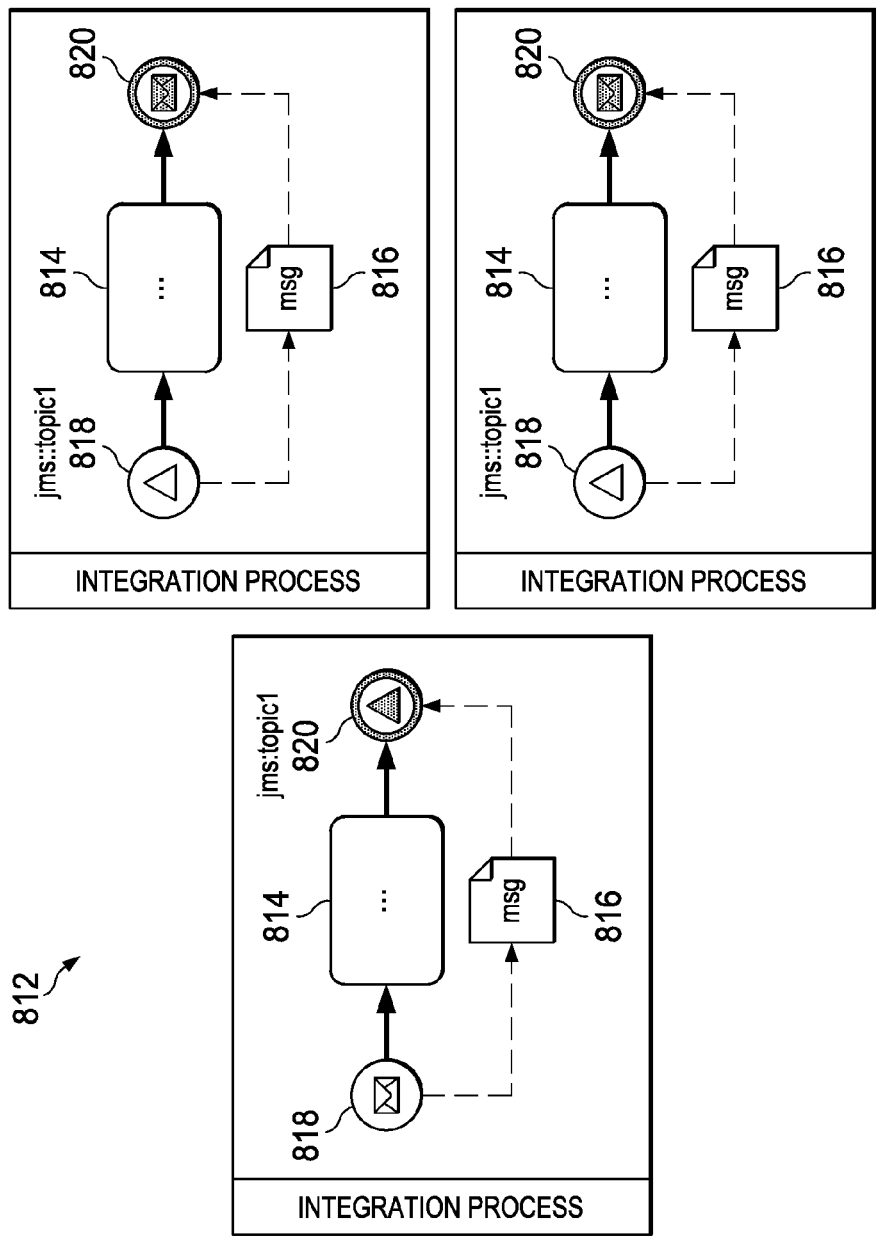
FIG. 8B is a diagram of an example transactional sub-process in a consumer adapter.

FIG. 8A is a diagram of example adapter modeling with message queuing using data stores. FIG. 8B is a diagram of an example transactional sub-process 812 in a consumer adapter. As shown in FIG. 8A, for example, AFs are used to model JMS adapters and the access to queues in a message broker, which is represented as a BPMN Data Store. This allows the attachment of configurations to the data store (such as connection details) and to the BPMN Data Association. This further allows the attachment of the enqueue/dequeue tasks in the producer adapter to the data store (such as queue/topic names). Through a BPMN timer event, for example, the polling behavior of a consumer adapter can be modeled. For instance, FIG. 8A shows the periodical, transactional dequeue of messages using a BPMN task within a transactional subprocess, which specifies the transactional boundaries. In case of exceptions that occur during the task processing within these boundaries, the message is not dequeued from the queue. Instead, a message redelivery would be attempted in the next polling interval. Although publish/subscribe scenarios can be modeled similarly, they could be represented by BPMN signal end/start events as depicted in FIG. 8B. The transferred message can be determined by the associated BPMN data object, and the corresponding events can be identified by their matching names. Doing so can make the inner mechanics implicit, but would allow for the modeling of an event-based consumer adapter. FIGS. 8A and 8B also show tasks 814, messages 816, start events 818, end events 820, and a message broker 822.

Figure 9A:
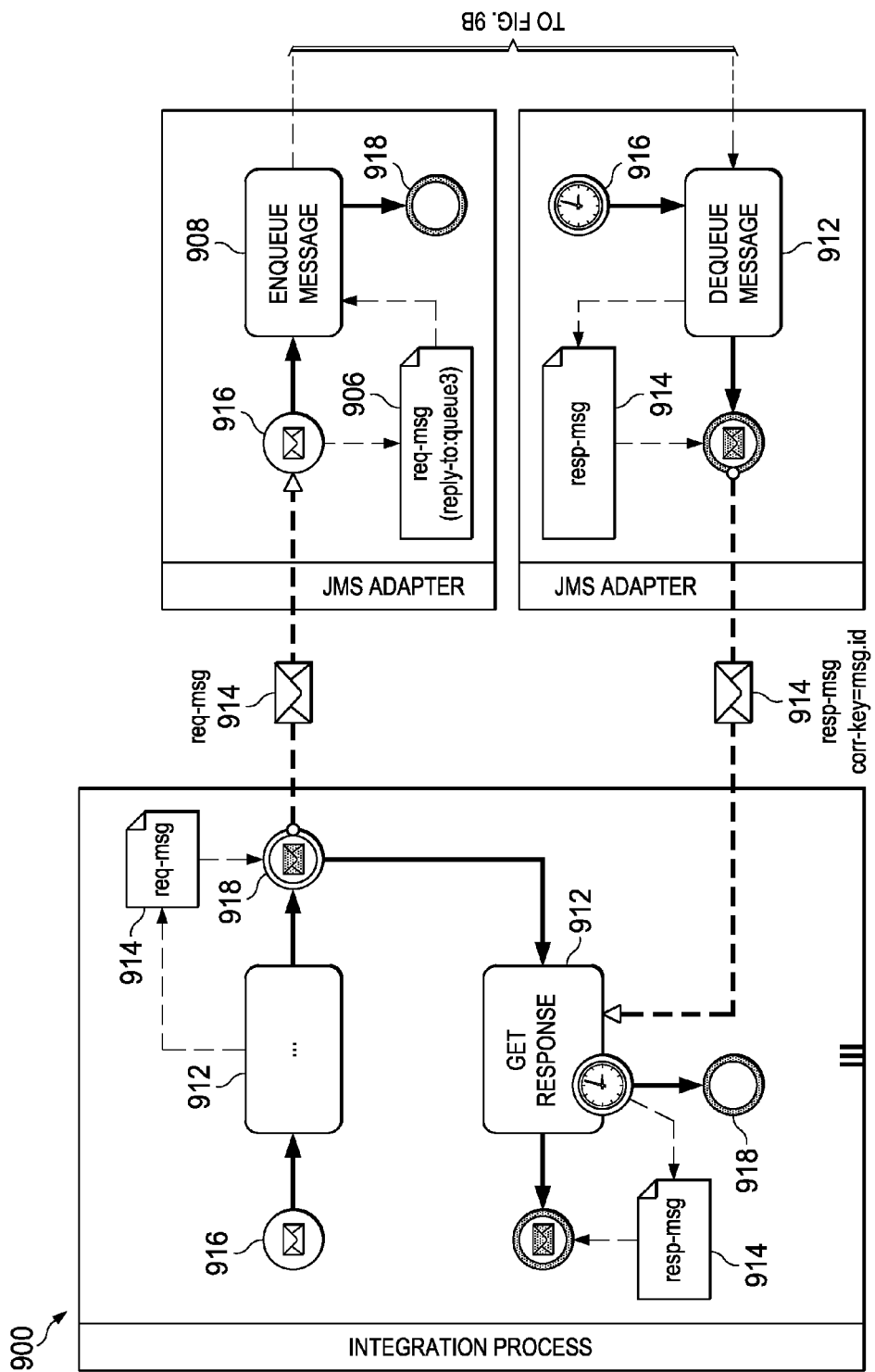
FIGS. 9A-9B are a diagram of example adapter modeling with message queuing using data-stores 902 and explicit modeling of request/reply using response queues.
Figure 9B:
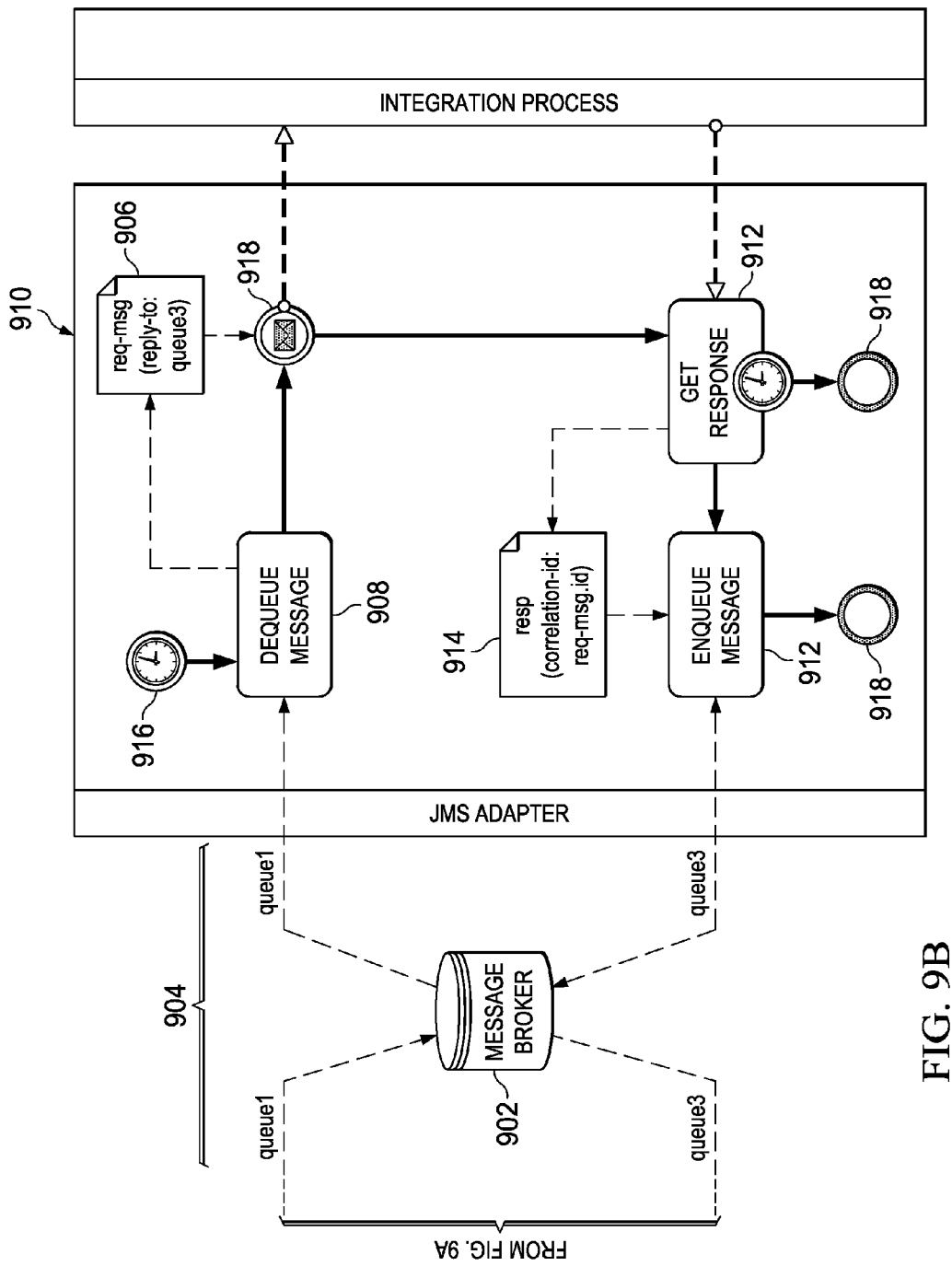

FIGS. 9A-9B are a diagram of example adapter modeling 900 with message queuing using data-stores 902 and explicit modeling of request/reply using response queues 904. As such, FIGS. 9A-9B depict an example of reliable asynchronous, inOut messaging. In this example, a "reply-to" header field 906 attached to the req-msg 908 is assumed, indicating that a JMS Adapter 910 should reply to the specified queue. The queued response is correlated to the waiting integration process instance by using the identifier of the req-msg. FIGS. 9A-9B also show tasks 912, messages 914 start events 916, and end events 918.

Figure 11A:
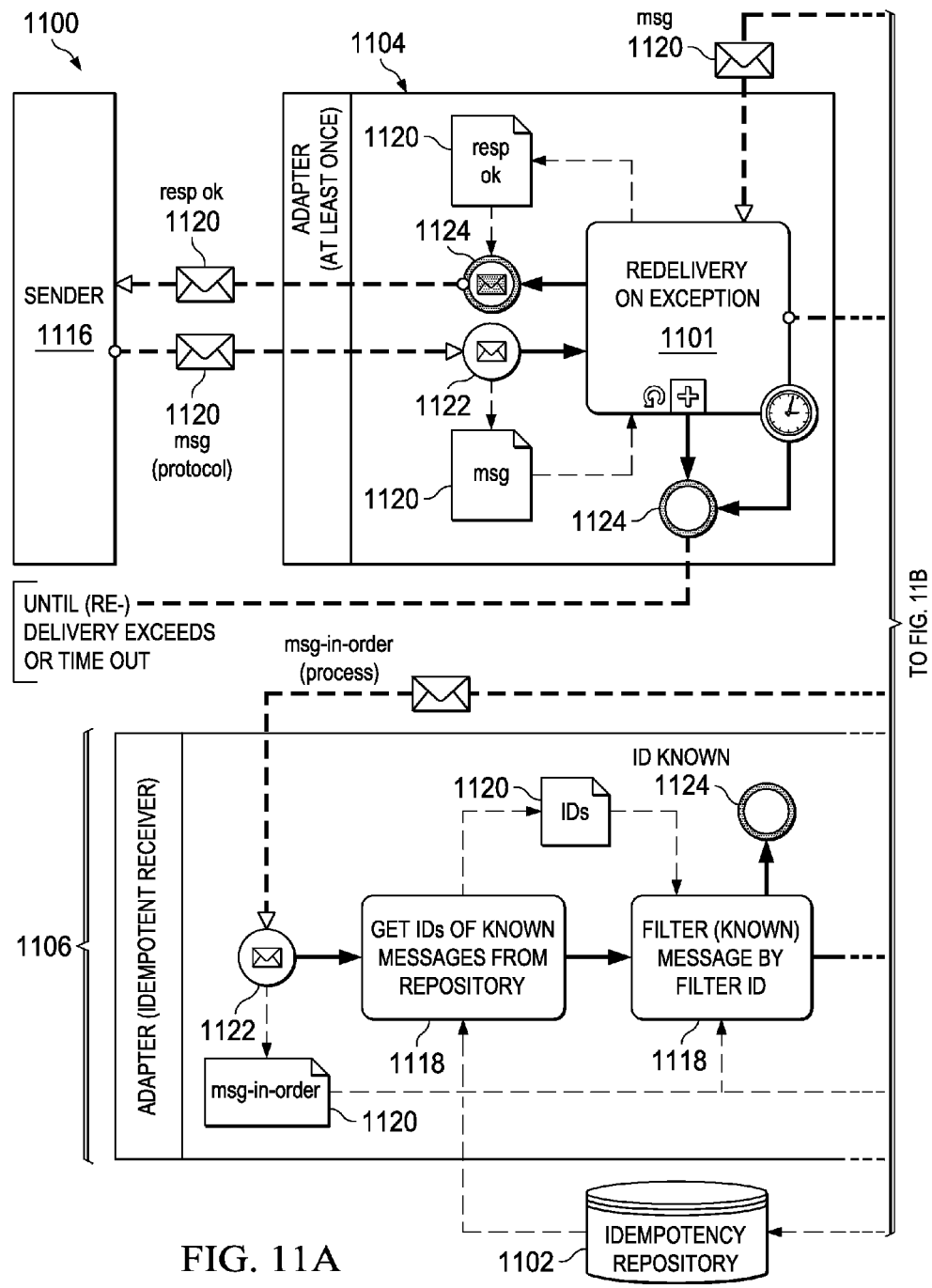
FIGS. 11A-11B are a diagram of an example EOIO model.
Figure 11B:
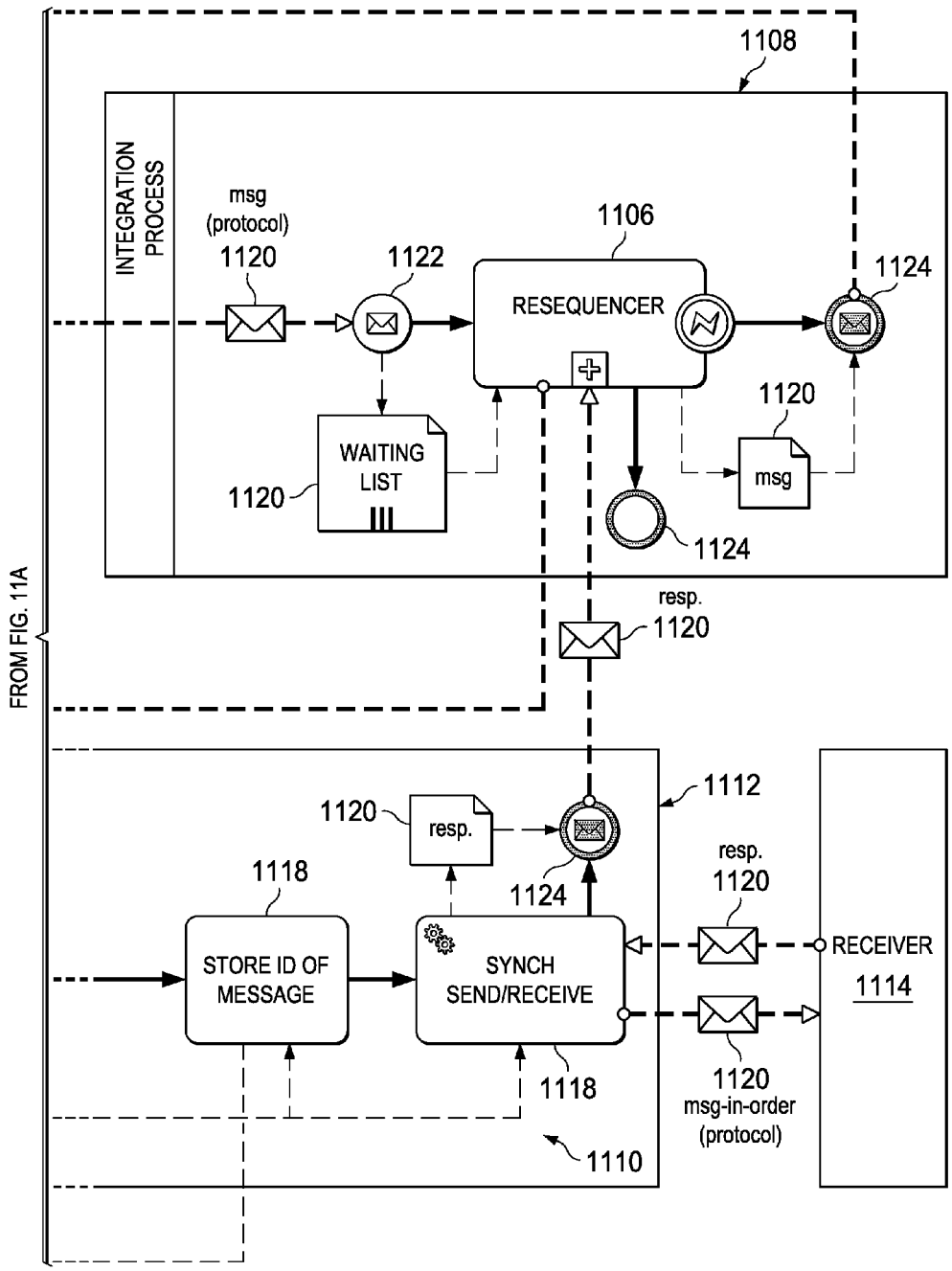

In some implementations, an idempotency repository 1102 (described below with reference to FIGS. 11A-11B) can be used to support at-most-once (AMO) and exactly once (EO) (e.g., in combination with reliable messaging). In this way, the integration system needs to take care that messages are not sent twice to a receiver 1114. This can be modeled by a flow step the integration process (or AF) that filters already sent messages, which is preferably executed just before the message is sent to the receiving application in a producer AF. FIGS. 11A-11B, described below, show the filter processing as part of a producer AF 1112 by accessing the idempotency repository 1102, which is represented as a BPMN data store, storing the identifiers of already processed messages against which the current message identifier can be checked.

In an example of message re-sequencing, a resequencer can be used for in-order (IO) scenarios, for which the messages are ordered according to a sequence number. Alternatively, order preserving queues (e.g., specified in JMS) are used to keep messages in sequence. EOIO processing can additionally require the combination of reliable messaging with redelivery semantics and a filter step using the idempotency repository 1102 to guarantee that the messages are sent exactly once and in order.

In some implementations, abstract definitions of BPMN AFs and integration patterns can be applied to the motivating "Internet of Things" examples (e.g., as described above). For example, the AFs and integration patterns can provide secure, reliable messaging through the case of EOIO integration, which represents a complex configuration from the important area of QoS. Further, the abstract definitions of BPMN AFs and integration patterns support the visualization and re-configuration of the expected default exception handling and compensation in a reliable time series normalization scenario.

Figure 10:
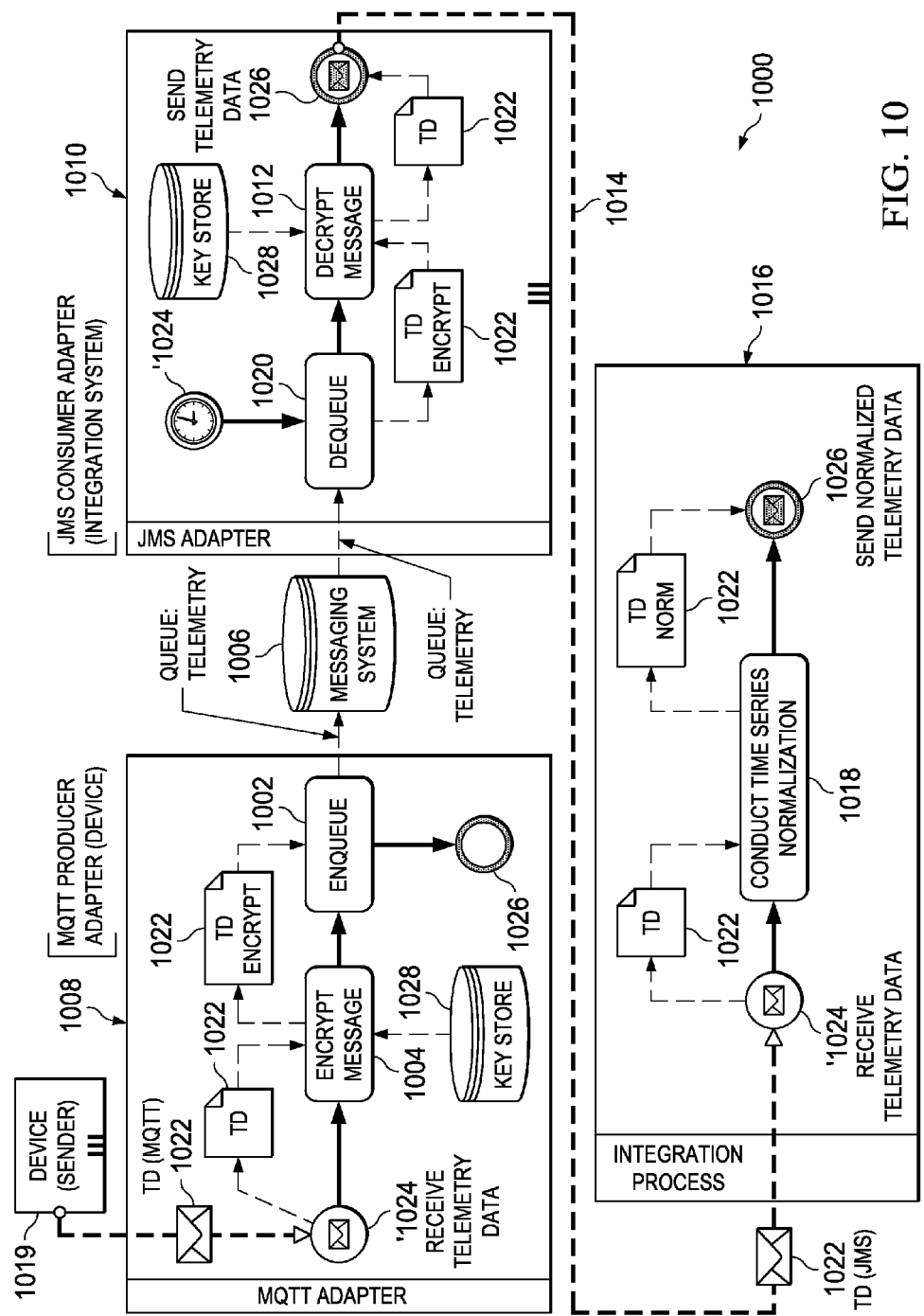
FIG. 10 is a diagram of an example time series normalization scenario including reliable, secure messaging.

FIG. 10 is a diagram of an example time series normalization scenario 1000 including reliable, secure messaging. For example, FIG. 10 shows a syntax proposal that follows a mapping to BPMN. The devices enqueue 1002 an encrypted TD message 1004 to the telemetry queue 1006 in the messaging system using an MQTT adapter 1008. The integration process listens to the queue using a JMS adapter 1010, which decrypts 1012 received messages and passes 1014 them to an integration process 1016, where the message content is normalized 1018. FIG. 10 also shows a sender 1019, a dequeue task 1020, messages 1022, start events 1024, end events 1026, and key stores 1028.

The QoS support is crucial for integration systems. When sending a message synchronously to a receiver, for example, BE can be applied, e.g., delivery will be attempted, otherwise the sender 1019 will receive an exception message. In case of asynchronous, reliable, in-order messaging, this approach is not sufficient. The message has to be persistently stored, and a retry has to be started to guarantee its delivery, e.g., in a message queue, since the sender cannot be notified. In addition, the order of the messages according to a message sequence has to be guaranteed using a resequencer pattern.

FIGS. 11A-11B are a diagram of an example EOIO model 1100. For example, the model supports message redelivery 1101 in a consumer adapter 1104, a resequencer 1106 in an integration process 1108, and idempotent message handling 1110 in a producer adapter 1112. If in addition, duplicate messages are filtered out during the processing, the QoS is called EOIO, as shown syntactically in FIGS. 11A-11B. The consumer AF starts with a synchronous part by storing the message and sending a response. In this example, a redelivery on exception sub-process acts as a combined ALO, synch/asynch bridge pattern. This then starts the asynchronous delivery of the message to the integration process, which collects messages and orders them along defined sequences using a resequencer sub-process pattern and synchronously emits the messages to the producer adapter 1112.

The producer adapter 1112 checks whether a message has already been processed and synchronously sends it to a receiver 1114. The receiver's response (e.g., acknowledgement or exception) is passed to the integration process 1108, which triggers a message redelivery on exception. FIGS. 11A-11B also show a sender 1116, other tasks 1118, messages 1120, start events 1122, and end events 1124.

In some implementations, information associated with qualitative analysis and experiences can be collected. For example, collection of information can include practical experiences with the defined adapter modeling based on an evaluation by experienced integration experts. The evaluation of the approach can be summarized to various topics, which are discussed in detail below. Information that is collected can be used to determine, for example, that in general, the integration models with an explicit AF are experienced as more complex. This determination may, for example, contradict the intended/predicted usage of BPMN by business experts. However, the visibility of the default adapter characteristics can allow for better insights into the integration flow modeling, ease of use, and a more intuitive and faster modeling through the identified patterns.

In some implementations, tool support explicitly modeled AFs can lead to more complex IFlows that require adequate tool support, as users do not want to model them piece by piece. For example, using a "collapsed," read-only visualization of the AF, the insights can be available on expansion of the pool. Adapters without complex flow logic can remain as message flows. One example technical challenge involved in modeling is the resolution of AFs that become a "first-level" syntax construct, when represented as collapsed/expanded pool. The AF could be edited in an external view, which would reduce the complexity on a view. However, the view can hide information through "out-of-context" placement. In some implementations, an in-context editing view can be embedded into the IFlow, however the tool can make it more difficult to distinguish between integration processes and AF. In some implementations, an editor can also function purely on a pattern level, thus making the EIPs and the AF patterns first-class entities. As a result, a user would not model an IFlow such as the EOIO scenario piece-by-piece, but could select from a list of QoS patterns. According to the feedback (e.g., received from modeling experts), the pattern-based approach can help to deal with the complex syntax and can allow for more modular modeling.

Modeling complexity is another factor to consider regarding modeling. For example, some BPMN syntax elements are not applicable to the integration environment in a useful way. For example, the lane element has no semantic meaning and can only be used to structure certain aspects of the integration systems, such as distinguishing normal logic from AF logic. One possible result is an increase in the size of a diagram leading to a confusing model. Additionally, as described with respect to FIG. 8A, for queuing with a message broker, the data association to the message broker is denoted with the queue name to/from messages that should be enqueued/dequeued. The modeling complexity in FIG. 8A may be rated as complex, e.g., the adapter 802 communicates with the adapter 808, while the adapter 804 seems more related to the adapter 802. However, the use of this model was determined to be favored over the BPMN signal approach proposed for FIG. 8B. In case of many connections to the message broker, a partitioning of the IFlow into several smaller diagrams can help to make the single parts more understandable (e.g., "in-context" editing). At the same time, tool support can be needed to show the complete IFlow on demand. The alternative of modeling several instances of one broker in one IFlow, which are then connected to related adapters only, is not seen as a desirable solution.

In some implementations, modeling preferences made by experts can be used. For example, while the modeling of AFs may be very well received, the participants who are evaluating models may differentiate between producer and consumer adapter modeling. Producer adapter modeling, for example, can allow for adding scenario-specific "pre-processing" capabilities to the system, e.g., before entering the integration process (e.g., especially for bridges). Consumer AFs can be determined to be limited to the QoS support, while potential "post-processing" logic can be executed in the integration process. However, from a modularity and resource consumption point of view, a clear separation of adapter and integration process logic can be useful. The explicit modeling of security related topics such as key stores can also be evaluated. For example, while participants with a more technical background may prefer the proposed approach (e.g., helping them to be precise in the security aspect modeling), more business related participants may complain about the additional complexity. However, both groups may agree that a more explicit modeling of the inner workings of a message broker is not necessary, and the transactional de-queuing with the BPMN Transactional Sub-Process is rated intuitive.

In some implementations, model-driven adapter development and re-configuration can be used. For example, some approaches for automatic adapter generation and (dynamic) re-configuration can be based on a start of authority (SOA) domain or other approach that does not define a (conceptual) modeling approach for integration adapters. In another example, other approaches can be based on model-driven development of web services, e.g., while highlighting the importance of a QoS support. Other approaches can target self-adapting adapters in terms of signature-/protocol-level and quality related re-configurations and planning.

Other approaches can be based on data-intensive adapter modeling. For example, through data warehouse connectivity scenarios, an extract-transform-load (ETL) domain can be used for conceptual modeling of more "data-intensive" adapters. Although characteristics such as QoS may not be relevant for data warehouse connectivity, these modeling approaches can be seen as domain-specific, complementary work. For instance, ETL processes can be mapped to BPMN, and a maintenance framework can be provided. In some implementations, UML-based approaches can be used, e.g., for modeling data mining with time-series data or ETL data flows. The approaches can define new icon notations, e.g., that are similar to EIP notations. These approaches can focus on the data flow limits the modeling to data transformation.

In some implementations, other adapter types can be used in addition to the common adapter types used for integration systems, as described above. For example, adapter types that are used can extend the BPMN-based definition of IFlows by AF constructs and patterns, e.g., to make the default adapter behavior visible. Adapter types can also provide a basis for different scenario-specific adapter configurations. Definitions for adapters can start, for example, with a systematical analysis of common adapter characteristics, e.g., spanning to edge cases such as QoS modeling.

The mapping of these adapter characteristics to BPMN described above can allow the adapters to be linked to integration flows and can support definitions of common integration adapter processing capabilities and patterns. The approach can be applied to real-world Internet of Things integration scenarios, such as using the exactly-once-in-order (EOIO) QoS case. While there is a syntactical feasibility and applicability of the approach, any shortcomings due to BPMN's focus on control over data flow can be solved by explicit modeling of AFs as separate BPMN pools.

The approaches described above show the value of a modular, pattern-based and explicit modeling approach. However, other implementations permit modification of pre-existing elements and the syntax of BPMN models, such as that use of conditional data flows.

Figure 12:
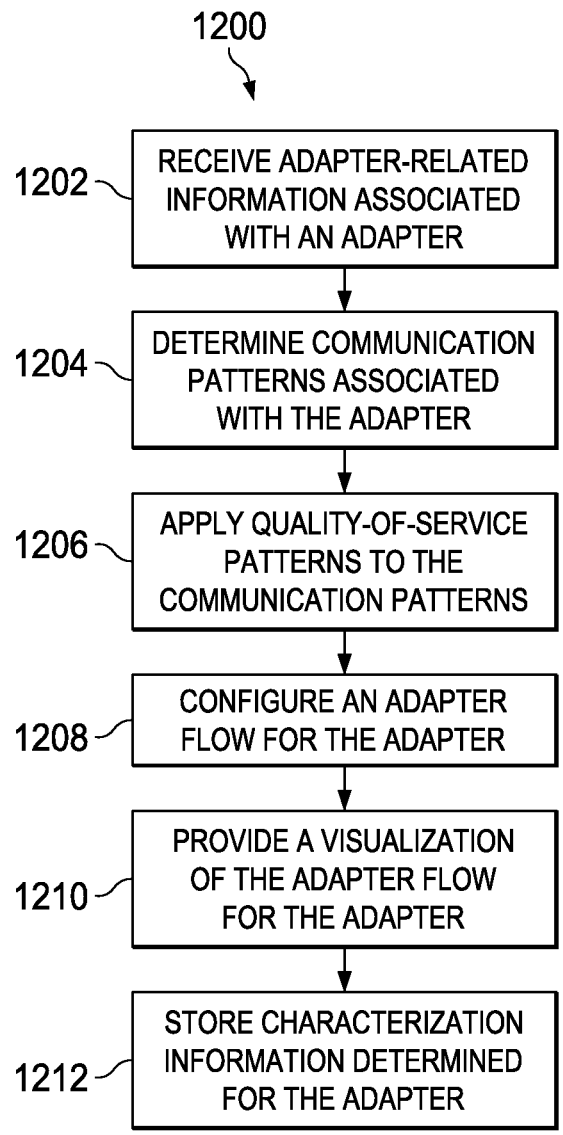
FIG. 12 is a flowchart of an example method for determining and storing an adapter characterization.

FIG. 12 is a flowchart of an example method 1200 for determining and storing an adapter characterization. For clarity of presentation, the description that follows generally describes method 1200 in the context of FIGS. 1-11. However, it will be understood that the method 1200 may be performed, for example, by any other suitable system, environment, software, and hardware, or a combination of systems, environments, software, and hardware as appropriate. For example, the server 104 and/or its components can be used to execute the method 1200.

At 1202, adapter-related information associated with an adapter is received. For example, the server 104 can receive user inputs, including adapter-related information, from the client device 102.

In some implementations, the adapter is an integration adapter, and receiving adapter-related information associated with an adapter includes the following. An adapter type is identified for the adapter. A modeling complexity is determined for the adapter. An integration style is determined for the adapter. A quality of service level is identified for the adapter. Adapter tasks and an architecture are captured associated with the adapter. These features, for example, are represented in FIGS. 2-11.

In some implementations, determining an integration style for the adapter includes identifying message exchange patterns that identify whether a message is in-only or in-out. For example, some of the adapters depicted in FIGS. 2-11 are shown as in-only or in-out.

In some implementations, adapter types include consumer-only adapters, producer-only adapters, consumer+ producer adapters, polling adapters, and event-based adapters. Examples of adapter types are described above with reference to FIGS. 2-11.

In some implementations, applying quality-of-service patterns to the communication patterns includes identifying message delivery types such as best effort (BE), at least once (ALO), exactly once (EO), and exactly once in order (EOIO). For example, various message delivery types are described above with reference to FIGS. 2-11.

In some implementations, each adapter is associated with a template. For example, various templates are described above with reference to FIGS. 2-11. In some implementations, when creating a new adapter, a user can review existing templates and select one of the templates as a starting point for modeling the new adapter. Selection of the template can be facilitated based on user inputs associated with the new adapter.

At 1204, communication patterns associated with the adapter are determined. For example, the communication pattern module 115 can determine communication patterns associated with an adapter. Determining communication patterns can include identifying communication styles and bridges for a given adapter and determining one or more processing patterns for the adapter, as described above with reference to FIGS. 2-1.

At 1206, quality-of-service patterns are applied to the communication patterns. As an example, the quality of service module 117 can apply quality-of-service patterns to the communication patterns. Applying quality-of-service patterns can include checking reliability messaging for the adapter, checking idempotency requirements for the adapter, and checking messaging re-sequencing for the adapter. Information used for applying quality-of-service patterns to the communication patterns can be accessed from the adapter information 110.

At 1208, an adapter flow is configured for the adapter. For example, the adapter flow module 119 can configure an adapter flow for the adapter based on adapter flow information that is stored in the adapter information 110. The adapter flows can match, for example, flows described above with reference to FIGS. 2-11.

At 1210, a visualization of the adapter flow for the adapter is provided. The visualization module 122, for example, can generate instructions so that a visualization for an adapter can be displayed on the client device 102. For example, the visualization can match one of the visualizations shown in FIGS. 2-11.

At 1212, characterization information determined for the adapter is stored. For example, the server 104 can store the characterization information for the adapter in the characterization data 111.

In some implementations, the stored characterization information can be used for a separation of an integration process and an adapter flow for modularity, deployment options, and potentially heterogeneous system setups (e.g., along the same semantics). For example, event stream processing or ETL system can be used at adapter runtime, while guaranteeing the (adapter) integration semantics.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media, and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user, and a keyboard and a pointing device, e.g., a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in Extensible Markup Language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products. Furthermore, while the operations depicted in the drawings may indicate start and/or end points for the operations, implementations of the methods described in the disclosure are not restricted to the particular start and/or end point as illustrated. Other implementations may start and/or end at different points of the operations.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method of modeling and storing characterized adapters, the method comprising:
    receiving, by a user request module of a server, an adapter-related information associated with an adapter, wherein receiving adapter-related information associated with an adapter include determining a modeling complexity for the adapter;
    determining, by a communication module of the server, communication patterns associated with the adapter, wherein determining communication patterns associated with the adapter includes identifying communication styles and bridges for the adapter, and determining one or more processing patterns for the adapter;
    applying, by a quality of service module of the server, quality-of-service patterns to the communication patterns, wherein applying quality-of-service patterns to the communication patterns includes checking reliability messaging for the adapter, checking idempotency requirements for the adapter, and checking messaging re-sequencing for the adapter;
    configuring, by an adapter flow module at the server, an adapter flow for the adapter;
    providing, by a visualization module of the server, a visualization of the adapter flow for the adapter to a client device; and
    storing characterization information determined for the adapter in a characterization data store of the server, wherein the stored characterization information is used in a separation of an integration process and an adapter flow for modularity, deployment options, and potentially heterogeneous system setups, along same semantics.

2. The method of claim 1, wherein the adapter is an integration adapter and wherein receiving adapter-related information associated with an adapter includes:
    identifying an adapter type for the adapter;
    determining an integration style for the adapter;
    identifying a quality of service level for the adapter; and
    capturing adapter tasks and an architecture associated with the adapter.

3. The method of claim 2, wherein determining an integration style for the adapter includes identifying message exchange patterns that identify whether a message is in-only or in-out.

4. The method of claim 2, wherein adapter types are selected from the group comprising consumer-only adapters, producer-only adapters, consumer+producer adapters, polling adapters, and event-based adapters.

5. The method of claim 1, wherein applying quality-of-service patterns to the communication patterns includes identifying message delivery types selected from the group comprising best effort (BE), at least once (ALO), exactly once (EO), and exactly once in order (EOIO).

6. The method of claim 1, wherein each adapter is associated with a template in an association including at least re-usability and pattern-based modeling.

7. A system for modeling and storing characterized adapters, the system comprising:
    one or more processors; and
    a memory storing:
        a library defining adapter information and characterization information; and
        an application, with instructions executed by the one or more processors, the instructions for:
            receiving, by a user request module of a server, adapter-related information associated with an adapter, wherein receiving adapter-related information associated with an adapter include determining a modeling complexity for the adapter;
            determining, by a communication module of the server, communication patterns associated with the adapter, wherein determining communication patterns associated with the adapter includes identifying communication styles and bridges for the adapter, and determining one or more processing patterns for the adapter;
            applying, by a quality of service module of the server, quality-of-service patterns to the communication patterns, wherein applying quality-of-service patterns to the communication patterns includes checking reliability messaging for the adapter, checking idempotency requirements for the adapter, and checking messaging re-sequencing for the adapter;

configuring, by a an adapter flow module at the server, an adapter flow for the adapter;

providing, by a visualization module of the server, a visualization of the adapter flow for the adapter to a client device; and storing characterization information determined for the adapter in a characterization data store of the server, wherein the stored characterization information is used in a separation of an integration process and an adapter flow for modularity, deployment options, and potentially heterogeneous system setups, along same semantics.

8. The system of claim 7, wherein the adapter is an integration adapter and wherein receiving adapter-related information associated with an adapter includes:

identifying an adapter type for the adapter;

determining an integration style for the adapter;

identifying a quality of service level for the adapter; and capturing adapter tasks and an architecture associated with the adapter.

9. The system of claim 8, wherein determining an integration style for the adapter includes identifying message exchange patterns that identify whether a message is in-only or in-out.

10. The system of claim 8, wherein adapter types are selected from the group comprising consumer-only adapters, producer-only adapters, consumer+producer adapters, polling adapters, and event-based adapters.

11. A non-transitory, computer-readable medium, the computer-readable medium comprising computer-readable instructions for modeling and storing characterized adapters embodied on tangible, non-transitory media, the instructions operable when executed by at least one computer to:

receive, by a user request module of a server, adapter-related information associated with an adapter, wherein receiving adapter-related information associated with an adapter include determining a modeling complexity for the adapter;

determine, by a communication module of the server, communication patterns associated with the adapter, wherein determining communication patterns associated with the adapter includes identifying communication styles and bridges for the adapter, and determining one or more processing patterns for the adapter;

apply, by a quality of service module of the server, quality-of-service patterns to the communication patterns, wherein applying quality-of-service patterns to the communication patterns includes checking reliability messaging for the adapter, checking idempotency requirements for the adapter; and checking messaging re-sequencing for the adapter;

configure, by a an adapter flow module at the server, an adapter flow for the adapter;

provide, by a visualization module of the server, a visualization of the adapter flow for the adapter to a client device; and store characterization information determined for the adapter in a characterization data store of the server, wherein the stored characterization information is used in a separation of an integration process and an adapter flow for modularity, deployment options, and potentially heterogeneous system setups, along same semantics.

12. The computer-readable medium of claim 11, wherein the adapter is an integration adapter and wherein receiving adapter-related information associated with an adapter includes:

identifying an adapter type for the adapter;

determining an integration style for the adapter;

identifying a quality of service level for the adapter; and capturing adapter tasks and an architecture associated with the adapter.

13. The computer-readable medium of claim 12, wherein determining an integration style for the adapter includes identifying message exchange patterns that identify whether a message is in-only or in-out.

* * * * *